(12) United States Patent
Sharpe et al.

(10) Patent No.: US 11,675,242 B1
(45) Date of Patent: *Jun. 13, 2023

(54) ELECTROCHROMIC DEVICES WITH PATTERNED ELECTRICALLY CONDUCTIVE LAYERS

(71) Applicant: Halio, Inc., Hayward, CA (US)

(72) Inventors: Scott Sharpe, Hayward, CA (US);
Cyrus Elias, Hayward, CA (US);
Jonathan Ziebarth, Hayward, CA (US)

(73) Assignee: Halio, Inc., Hayward, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 16/544,764

(22) Filed: Aug. 19, 2019

Related U.S. Application Data

(63) Continuation of application No. 15/588,522, filed on May 5, 2017, now Pat. No. 10,386,688.

(60) Provisional application No. 62/435,489, filed on Dec. 16, 2016, provisional application No. 62/333,056, filed on May 6, 2016.

(51) Int. Cl.
| | |
|---|---|
| *G02F 1/153* | (2006.01) |
| *G02F 1/155* | (2006.01) |
| *G09G 3/38* | (2006.01) |
| *G02F 1/163* | (2006.01) |
| *E06B 9/24* | (2006.01) |
| *E06B 3/67* | (2006.01) |
| *G02F 1/01* | (2006.01) |

(52) U.S. Cl.
CPC ............ *G02F 1/155* (2013.01); *E06B 3/6722* (2013.01); *E06B 9/24* (2013.01); *G02F 1/163* (2013.01); *G09G 3/38* (2013.01); *E06B 2009/2464* (2013.01); *G02F 1/01* (2013.01); *G02F 1/0121* (2013.01); *G02F 1/153* (2013.01); *G02F 2001/1552* (2013.01)

(58) Field of Classification Search
CPC . G02F 1/155; G02F 1/163; G02F 1/01; G02F 1/0121; G02F 1/153; G02F 2001/1552; E06B 3/6722; E06B 9/24; E06B 2009/2464; G09G 3/38
USPC .................................................. 359/265–275
See application file for complete search history.

(56) References Cited

U.S. PATENT DOCUMENTS 10,386,688 B1 * 8/2019 Sharpe .................... G02F 1/163

* cited by examiner

*Primary Examiner* — William Choi

(57) ABSTRACT

An electrochromic device is provided. The device includes a first transparent substrate and a second transparent substrate and a first electrically conductive layer and a second electrically conductive layer. A first bus bar is in contact with the first electrically conductive layer and a second bus bar in contact with the second electrically conductive layer. The first and second electrically conductive layers are patterned with sets of scribed lines substantially parallel to the corresponding bus bar, wherein the sets of scribed lines are made up of a series of collinear segments, which are gaps in the electrically conductive layer, wherein the length of the collinear segments, the period, the valve width and the offset between segments in adjacent scribed lines determines the resistance to the flow of electrons traversing a set of scribed lines in the direction substantially perpendicular to the corresponding bus bar.

18 Claims, 21 Drawing Sheets

ELECTROCHROMIC DEVICES WITH PATTERNED ELECTRICALLY CONDUCTIVE LAYERS

FIELD OF THE INVENTION

The present invention generally relates to switchable electrochromic devices, such as architectural windows, capable of coordinated switching in a uniform manner over substantially their entire area or a selected subregion of their entire area. Embodiments of this invention include the laser scribing of a transparent conductive layer to form a gradient to enable the uniform switching of the electrochromic device.

BACKGROUND

Commercial switchable glazing devices are well known for use as mirrors in motor vehicles, automotive windows, aircraft window assemblies, sunroofs, skylights, and architectural windows. Such devices may comprise, for example, inorganic electrochromic devices, organic electrochromic devices, switchable mirrors, and hybrids of these having two conducting layers with one or more active layers between the conducting layers. When a voltage is applied across these conducting layers the optical properties of a layer or layers in between change. Such optical property changes are typically a modulation of the transmissivity of the visible or the solar subportion of the electromagnetic spectrum. For convenience, the two optical states will be referred to as a lightened state and a darkened state in the following discussion, but it should be understood that these are merely examples and relative terms (i.e., one of the two states is "lighter" or more transmissive than the other state) and that there could be a set of lightened and darkened states between the extremes that are attainable for a specific electrochromic device; for example, it is feasible to switch between intermediate lightened and darkened states in such a set.

Switching between a lightened and a darkened state in relatively small electrochromic devices such as an electrochromic rear-view mirror assembly is typically quick and uniform, whereas switching between the lightened and darkened state in a large area electrochromic device can be slow and spatially non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device. As a result, there may be a significant difference between the transmissivity near the edge of the device and the transmissivity at the center of the device. Over time, however, the difference in applied voltage between the center and edge decreases and the difference in transmissivity at the center and edge of the device decreases. In such circumstances, the electrochromic medium will typically display non-uniform transmissivity by initially changing the transmissivity of the device in the vicinity of the applied potential, with the transmissivity gradually and progressively changing towards the center of the device as the switching progresses. While the iris effect is most commonly observed in relatively large devices, it also can be present in smaller devices that have correspondingly higher resistivity conducting layers.

BRIEF DESCRIPTION OF THE DRAWINGS

To facilitate further description of the embodiments, the following drawings are provided in which:

FIG. 5 shows an example where the sets of scribed lines all contain 2 scribed lines, the valve width 306 and the offset between segments in adjacent scribed lines 308 are all constant for every set of scribed lines $x_n$, but the length of the scribed segments 304a, 304b and 304c are different for different sets of scribed lines, causing the resistance to the flow of electrons traversing a set of scribed lines to be different for different sets of scribed lines.

Figure 1:
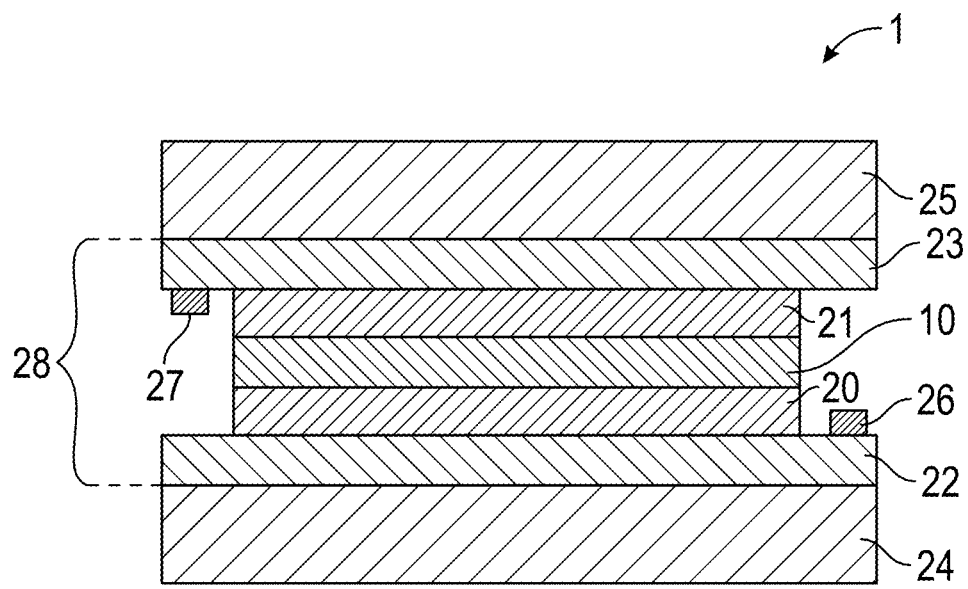
FIG. 1 is a schematic cross-section of a multi-layer electrochromic device of the present invention.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions and methods are provided to better define the present invention and to guide those of ordinary skill in the art in the practice of the present invention. Unless otherwise noted, terms are to be understood according to conventional usage by those of ordinary skill in the relevant art.

The term "anodic electrochromic layer" refers to an electrode layer that changes from a more transmissive state to a less transmissive state upon the removal of ions.

The term "cathodic electrochromic layer" refers to an electrode layer that changes from a more transmissive state to a less transmissive state upon the insertion of ions.

The terms "conductive" and "resistive" refer to the electrical conductivity and electrical resistivity of a material.

The term "convex polygon" refer to a simple polygon in which every internal angle is less than or equal to 180 degrees, and every line segment between two vertices remains inside or on the boundary of the polygon. Exemplary convex polygons include triangles, rectangles, pentagons, hexagons, etc., in which every internal angle is less than or equal to 180 degrees and every line segment between two vertices remains inside or on the boundary of the polygon.

The term "cross-layer resistance" as used in connection with a layer (or an elongate structure) is the resistance to current flow substantially normal to a major surface of the layer (or the elongate structure).

The term "electrochromic layer" refers to a layer comprising an electrochromic material.

The term "electrochromic material" refers to materials that are able to change their optical properties, reversibly, as a result of the insertion or extraction of ions and electrons. For example, an electrochromic material may change between a colored, translucent state and a transparent state.

The term "electrode layer" refers to a layer capable of conducting ions as well as electrons. The electrode layer contains a species that can be oxidized when ions are inserted into the material and contains a species that can be reduced when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode stack.

The term "sheet resistance" as used in connection with a layer (or an elongate structure) is the resistance to current flow substantially parallel to a major surface of the layer (or the elongate structure).

The term "transmissive" is used to denote transmission of electromagnetic radiation through a material.

The term "transparent" is used to denote substantial transmission of electromagnetic radiation through a material such that, for example, bodies situated beyond or behind the material can be distinctly seen or imaged using appropriate image sensing technology.

DETAILED DESCRIPTION

Electrochromic Device with Improved Switching Uniformity

Embodiments of the current invention describe electrochromic devices that are enabled to have more spatially uniform optical properties during switching between different light transmission levels. In other words, the electrochromic devices will uniformly tint or lighten in color across the entire device during a transition between tint levels. This "uniform switching" may be enabled by creating a gradient transparent conductive layer in contact with the electrodes of the electrochromic device. This gradient transparent conductive layer has the effect of mitigating the drop in effective voltage across a substrate. This is most noticeable in large scale electrochromic devices with enough distance between the bus bars that there is a significant drop in effective voltage.

Embodiments of this invention describe gradient patterns in transparent conductive layers that provide uniform switching in electrochromic devices. These gradient patterns may be formed in a transparent conductive layer having a uniform thickness across the substrate of the electrochromic device. Methods of forming the gradient patterns using etching, and in particular laser etching or scribing, are described herein. In an embodiment a patterned transparent conducting layer having a number of sets of scribed lines and an electrochromic device incorporating such a gradient patterned transparent conducting layer is described.

FIG. 1 depicts a cross-sectional structural diagram of electrochromic device 1 according to a first embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 that are formed of gradient transparent conductive layers. These electrically conductive layers are arranged against outer substrates 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage that causes electrons and ions to move between first and second electrode layers 20 and 21 and, as a result, electrochromic material in the first and/or second electrode layer(s) change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" refers to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

The materials making up electrochromic stack 28 may comprise organic or inorganic materials, and they may be solid or liquid. For example, in certain embodiments the electrochromic stack 28 comprises materials that are inorganic, solid (i.e., in the solid state), or both inorganic and solid. Inorganic materials have shown better reliability in architectural applications. Materials in the solid state can also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. In certain other embodiments some or all of the materials making up electrochromic stack 28 are organic. Organic ion conductors can offer higher mobilities and thus potentially better device switching performance. Organic electrochromic layers can provide higher contrast ratios and more diverse color options. Each of the layers in the electrochromic device is discussed in detail, below. It should also be understood that solid state material may be deposited or otherwise formed by processes employing liquid components such as certain processes employing sol-gels or chemical vapor deposition.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the invention, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic devices of the present invention may have a wide range of sizes. In general, it is preferred that the electrochromic device comprise a substrate having a surface with a surface area of at least 0.01 meter$^2$. For example, in certain embodiments, the electrochromic device comprises a substrate having a surface with a surface area of at least 0.1 meter$^2$. By way of further example, in certain embodiments, the electrochromic device comprises a substrate having a surface with a surface area of at least 1 meter$^2$. By way of further example, in certain embodiments, the electrochromic device comprises a substrate having a surface with a surface area of at least 5 meter$^2$. By way of further example, in certain embodiments, the electrochromic device comprises a substrate having a surface with a surface area of at least 10 meter$^2$.

At least one of the two electrically conductive layers 22, 23 is also preferably a transparent conductive layer in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nano particles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electric connection between the voltage source and the electrically conductive layers 22 and 23.

The sheet resistance, $R_s$, of the first and second electrically conductive layers 22 and 23 can vary from about 500Ω/□ to 1Ω/□, or from about 100Ω/□ to 5Ω/□, or from about 50Ω/□ to 5Ω/□, or from about 25Ω/□ to 5Ω/□, or from about 20Ω/□ to 5Ω/□, or from about 10Ω/□ to 5Ω/□, or from about 30Ω/□ to 10Ω/□, or from about 20Ω/□ to 10 Ω/□.

The multi-layer devices of the present invention may have a rectangular shape, or a shape other than rectangular, may have two bus bars, or may have more than two bus bars, may have the bus bars on the opposite sides of the device, and/or may not have the bus bars on opposite sides of the device. For example, the multi-layer device may have a perimeter that is more generally a quadrilateral, or a shape with greater or fewer sides than four for example, the multi-layer device may be triangular, pentagonal, hexagonal, etc., in shape. By way of further example, the multi-layer device may have a perimeter that is curved but lacks vertices, e.g., circular, oval, etc. By way of further example, the multi-layer device may comprise three, four or more bus bars connecting the multi-layer device to one or more power supplies, or the bus bars, independent of number may be located on non-opposing sides. In each of such instances, the preferred resistance profile in the electrically conductive layer(s) may vary from that which is described for the rectangular, two bus bar configuration.

Figure 2:
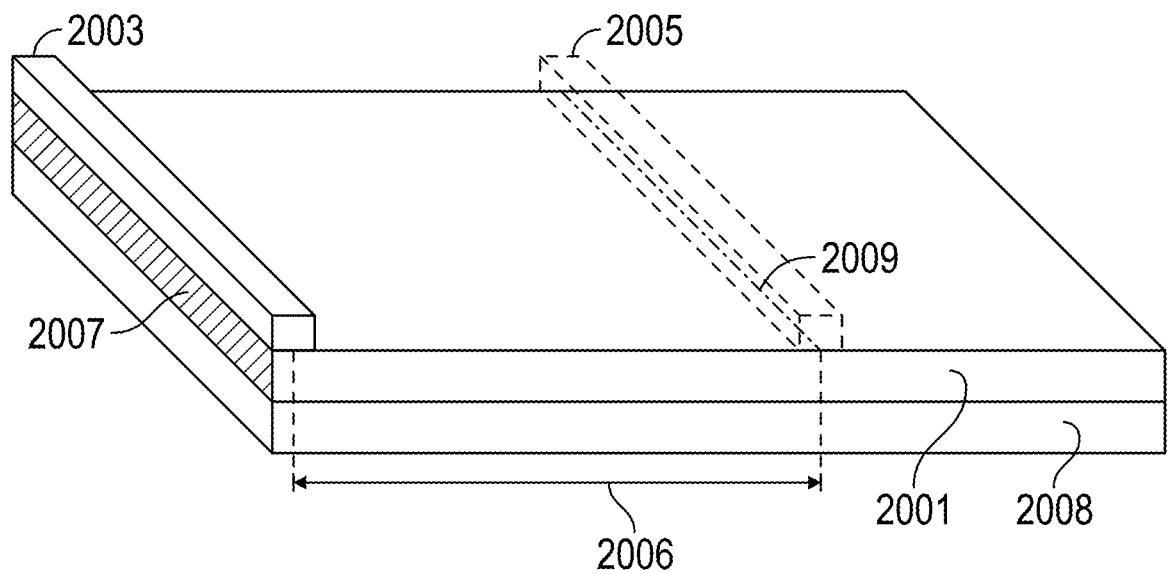
FIG. 2 is a schematic of an electrochromic device with a substrate 2008, an electrically conductive layer 2001 on top of the substrate, and a bus bar applied to one edge 2003.

In one exemplary instance, a substrate of an electrochromic device contains an electrically conductive layer, and the substrate and electrically conductive layer are substantially rectangular, and there is one or more electrical connections (e.g., bus bars) applied on the electrically conductive layer. FIG. 2 shows such an electrochromic device with a substrate 2008, an electrically conductive layer 2001 on top of the substrate, and a bus bar applied to one edge 2003. The resistance between the bus bar, and a substantially parallel line in the first electrically conductive layer (shown as a dot-dash line in the FIG. 2009 may be defined. In this disclosure, the resistance between a bus bar and a substantially parallel line in an electrically conductive layer is equivalent to the resistance that would be measured if an ohmic test contact 2005 (with zero contact resistance) was connected, or temporarily applied, to the electrically conductive layer along the line and the resistance was measured between the bus bar and the test contact. If the electrically conductive layer is uniform, then the resistance between a bus bar and a substantially parallel line would increase linearly as the distance between the bus bar and the parallel line increased, and can be described by the equation $r=\rho*l/A$, where r is the resistance between the bus bar and a substantially parallel line on the electrically conductive layer, ρ is the bulk resistivity of the top electrically conductive layer, l is the distance between the bus bar and the line 2006, and A is the cross-sectional area of the electrically conductive layer 2007.

Alternatively, if the electrically conductive layer is non-uniform as a function of position perpendicular to the bus bar, then the resistance between the bus bar and a substantially parallel line will increase non-linearly as the distance between the bus bar and the line increases. In some cases, the bulk resistivity of the electrically conductive layer is non-uniform. In some cases, the cross-sectional area of the electrically conductive layer is non-uniform (e.g. the thickness varies across the substrate). In some cases, the electrically conductive layer may be patterned, so that the resistance from the bus bar to a substantially parallel line varies non-linearly, as is described more completely below.

There are different ways to create gradients in the transparent conductive layers. The gradients may be accomplished by any technique that creates a non-linearly varying resistance between the bus bar and a line on the layer, such as by changing the sheet resistance of the electrically conductive layer or by patterning the electrically conductive layer. The sheet resistance of the electrically conductive layer may be changed by changing the layer thickness or the electrical properties of the materials of the electrically conductive layer. For example, the electrical properties of the electrically conductive layer materials can change by changing the resistivity of thin film materials (e.g., by changing the composition, dopant/impurity concentrations, or crystallinity of the materials), changing the morphology of a nanostructured conductive layer (e.g., the spacing between conductive nanowires), or changing the electrical properties of a nanostructured conductive layer (e.g., the inter-wire resistance of a nanowire mesh). The gradients in thickness or electrical properties of the electrically conductive layer(s) can be smoothly varying, or discretely varying. In some cases, discrete patterns are formed on one or both electrically conductive layers, which cause the resistance between the bus bar and a line within one or both electrically conductive layers to vary non-linearly. In some embodiments, the sheet resistance of one or more electrically conductive layer(s) is changed and discrete patterns are formed on one or both electrically conductive layers, which cause the resistance between the bus bar and a line within one or both electrically conductive layers to vary non-linearly.

As will be described in more depth below, a non-linear change in the resistance between the bus bar and a line on one or both electrically conductive layers is advantageous in electrochromic devices, because it enables the local potential between the two electrically conductive layers of the device to be more uniform over the area of a device, and therefore the electrochromic device is enabled to have more spatially uniform optical properties (e.g., transmission) during switching. An electrochromic device with varying sheet resistance of one or more electrically conductive layer(s), may have improved uniformity during switching. An electrochromic device with discrete patterns formed on one or both electrically conductive layers, may have improved uniformity during switching. An electrochromic device with varying sheet resistance of one or more electrically conductive layer(s), and discrete patterns on one or both electrically conductive layers, may also have improved uniformity during switching.

Non-Uniform Electrically Conductive Layers to Provide Uniform Cell Potential

Isoresistance lines and resistance gradient lines can be plotted to describe a non-uniform sheet resistance of an electrically conductive layer. Isoresistance lines join points of equal sheet resistance, and resistance gradient lines are perpendicular to isoresistance lines. Referring to FIG. 1, in general, and independent of whether the multi-layer device has a shape other than rectangular, there are more than two electrical connections (e.g., bus bars), and/or the electrical connections (e.g., bus bars) are on opposite sides of the device, the sheet resistance, $R_s$, in the first electrically conductive layer 22, in the second electrically conductive layer 23, or in the first electrically conductive layer 22 and the second electrically conductive layer 23 may be plotted to join points of equal sheet resistance (i.e., isoresistance lines) as a function of (two-dimensional) position within the first and/or second electrically conductive layer. Plots of this general nature, sometimes referred to as contour maps, are routinely used in cartography to join points of equal elevation. In the context of the present invention, a contour map of the sheet resistance, $R_s$, in the first and/or second electrically conductive layer as a function of (two-dimensional) position within the first and/or second electrically conductive layer preferably contains a series of isoresistance lines (also sometimes referred to as contour lines) and resistance gradient lines (lines perpendicular to the isoresistance lines). The sheet resistance along a gradient line in the first and/or second electrically conductive layer(s) may be constant, or generally increase(s), or generally decrease(s), or generally increase(s) until it reaches a maximum and then generally decrease(s), or generally decrease(s) until it reaches a minimum and then generally increase(s).

Without wishing to be bound by any particular theory, and based upon certain experimental evidence obtained to-date, the local potential (i.e., voltage) between the electrically conductive layers in an electrochromic stack can be made substantially constant as a function of position by varying the sheet resistance in the two electrically conductive layers of the device. The local potential between the electrically conductive layers can also be referred to as the local device potential, or local cell potential. There are particular relationships between the sheet resistance of the first and second electrically conductive layers which will provide a substantially uniform local cell potential across the area of an electrochromic device. For the geometry shown in FIG. 3, with a rectangular top electrically conductive layer 2001, and a rectangular bottom electrically conductive layer 2002, a contact (bus bar 2003) to the top electrically conductive layer is made at x=0, and a contact (bus bar 2004) to the bottom electrically conductive layer is made at $x=x_t$, the relationship to provide a substantially uniform local cell potential is $$R'(x)=R(x)*(x_t/x-1),$$

where R(x) is the sheet resistance of the top electrically conductive layer as a function of position and R'(x) is the sheet resistance of the bottom electrically conductive layer as a function of position, and where the sheet resistance of the top and bottom electrically conductive layers are substantially constant in the y-direction for a given value of x. In this embodiment, the resistance gradient lines are oriented substantially along the x direction and the isoresistance lines are oriented substantially along the y-direction, for both the top and bottom electrically conductive layers. In this embodiment, with the geometry shown in FIG. 3, the top and bottom electrically conductive layers are substantially parallel, and a point on the bottom electrically conductive layer $(x_1,y_1,z_1)$ can be projected onto a point on the top electrically conductive layer $(x_1,y_1,z_2)$, as shown in the figure. An example of a solution of sheet resistance profiles that satisfy this relationship is a linear change in the sheet resistance of the top electrode, R(x)=a*x, and the sheet resistance of the bottom electrode R'(x)=a*($x_t$-x), where the sheet resistance of the top and bottom electrically conductive layers are substantially constant in the y-direction for a given value of x. Another example solution is R(x)=1/[a*($x_t$-x)] and R'(x)=1/(a*x), where the sheet resistance of the top and bottom electrically conductive layers are substantially constant in the y-direction for a given value of x.

r(x) is defined as the resistance between the bus bar 2003 and a line 2009 parallel to the bus bar in the top electrically conductive layer, where the line 2009 is at a position x (shown in the figure at position $x_1$). r'(x) is defined as the resistance between the bus bar 2004 and a line 2010 parallel to the bus bar in the bottom electrically conductive layer, where the line 2010 is at a position x (shown in the figure at position $x_1$). The equation that describes r(x) is the integral of the sheet resistance R(x) of the top electrically conductive layer divided by the top electrically conductive layer width W, $$r(x)=\int[R(x)/W]dx,$$

evaluated in the interval from x=0 to x=x. The equation that describes r'(x) is the integral of the sheet resistance R'(x) of the bottom electrically conductive layer divided by the bottom electrically conductive layer width W, $$r'(x)=\int[R'(x)/W]dx,$$

evaluated in the interval from x=x to $x=x_t$.

As a practical matter, devices do not need to precisely adhere to these relationships to realize the benefits of this invention. For example, in the case above where R'(x)=1/(ex), R'(0)=infinity. While one can practically create resistances of very large magnitude, a film with a R'(x)=1/(a*x+b) where b is small relative to a can exhibit significantly improved switching uniformity over a device with electrodes of uniform sheet resistance.

Electrochromic Devices with Patterned Electrically Conductive Layers to Provide a Uniform Cell Potential In rectangular electrochromic devices, patterns in the electrically conductive layers can be utilized to vary the resistance between the bus bar and a line parallel to the bus bar in the electrically conductive layers. In this case, the above relationships can be used to determine the specifications for the pattern that will improve the uniformity of the local cell potential across the area of the device. The integrals described above (that determine the resistance between the bus bar and a line parallel to the bus bar in an electrically conductive layer for a given desired sheet resistance profile) can be evaluated in different intervals, and the resulting values can be used to determine the patterns required to vary the resistance along gradient lines. The improved uniformity of the local cell potential will enable the electrochromic device to switch more uniformly.

Figure 4:
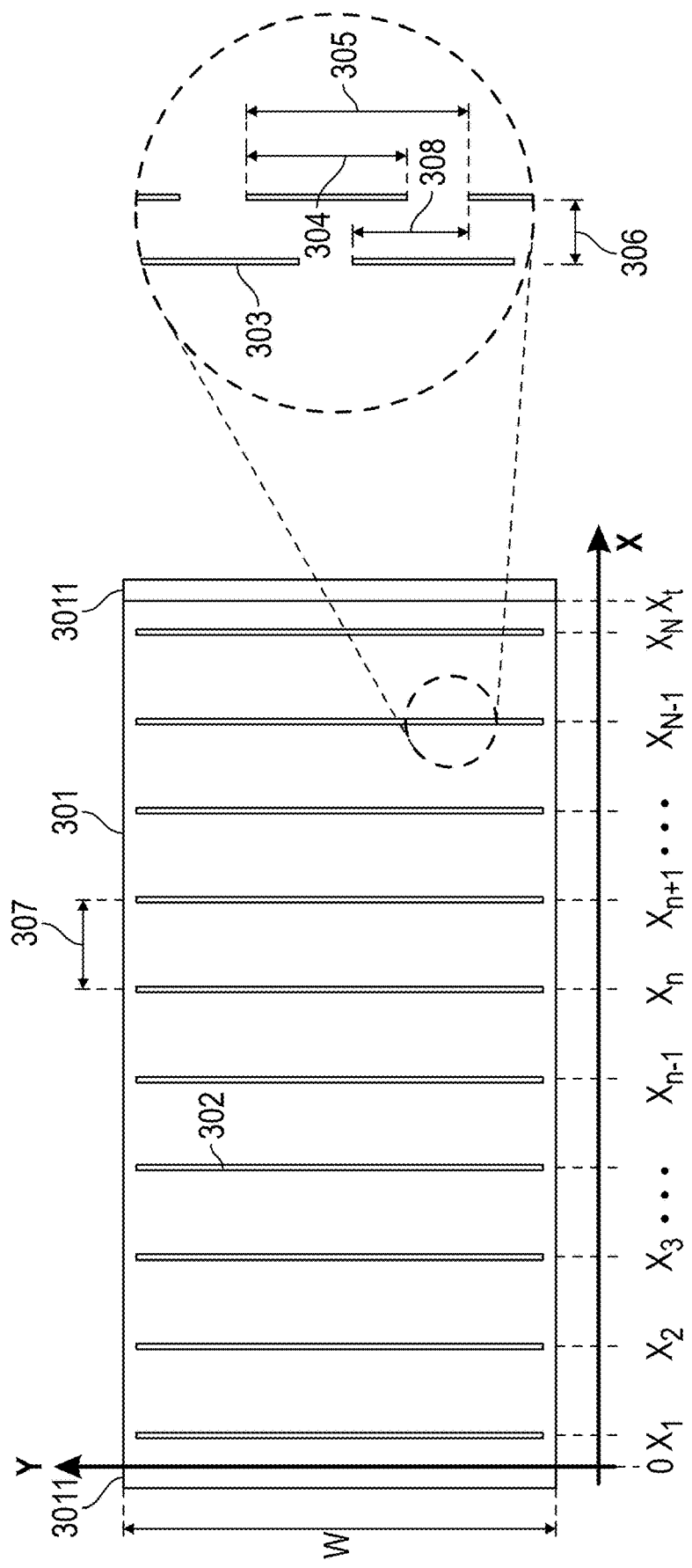
FIG. 4 is a schematic of a patterned electrically conductive layer 301 with a transparent conducting material with a number of sets of scribed lines 302, which are patterned into the transparent conducting material. The dark areas in the magnified region in FIG. 4 are a pattern of lines that represent gaps in the electrically conductive layer.

For example, FIG. 4 shows a patterned electrically conductive layer 301 with a transparent conducting material with a number of sets of scribed lines 302, which are patterned into the transparent conducting material. The dimensions of the geometrical parameters of the patterns are chosen to create the required resistance profiles according to the above relationships in order to improve the uniformity of the potential between the electrically conductive layers of the electrochromic stack (i.e., the local cell potential).

The dark areas in the magnified region in FIG. 4 are a pattern of lines that represent gaps in the electrically conductive layer. For instance, the electrically conductive layer can be a transparent conductive material (e.g., a transparent conductive oxide such as indium tin oxide, fluorine-doped tin oxide, or aluminum-doped zinc oxide), and the dark lines of the pattern represent areas where the transparent conductive material has been removed. In some cases, the pattern of gaps in the electrically conductive material are formed by laser ablation. In some cases, the pattern of gaps in the electrically conductive material are formed by chemical etching using a mask (e.g., where the mask is patterned by photolithography). In some cases, the gaps extend through the entire thickness of the electrically conductive material. In some cases, the gaps are formed by a patterned mask used during selective deposition of the electrically conductive layer, such as a shadow mask during physical vapor deposition.

In cases where the electrically conductive layer is composed of a transparent conducting material, the sheet resistance of the transparent conducting material is defined as $R_{TC}(x)$. $R_{TC}(x)$ can be constant in some cases (e.g. if the transparent conducting material is a transparent conducting oxide with uniform thickness). While in some cases, $R_{TC}(x)$ varies with position (e.g. if the transparent conducting material is a transparent conducting oxide with varying thickness).

In the example shown in FIG. 4, each set of scribed lines 302 contains a number of scribed lines. Each scribed line is made up of a series of collinear segments 303, which are gaps in the electrically conductive layer. The length of the collinear segments 304, the period 305, the valve width 306 and the offset between segments in adjacent scribed lines 308 determines the resistance to the flow of electrons traversing a set of scribed lines in the x direction. FIG. 4 shows that there are N sets of scribed lines 302 in the electrically conductive layer. The bus bar 3011 in this example is either at x=0 (i.e., on one electrically conductive layer, such as 27 in FIG. 1, and 2003 in FIG. 3), or at x=x$_t$ (i.e., on the opposing electrically conductive layer (i.e., 26 in FIG. 1, and 2004 in FIG. 3). In general, the x-positions of the sets of scribed lines are described as $[x_1, x_2, x_3, \ldots, x_{n-1}, x_n, x_{n+1}, \ldots, x_{N-1}, x_N]$.

In the rectangular electrochromic device shown in FIG. 4 the set of scribed lines $x_n$ can correspond to the scribed lines in the top or bottom electrically conductive layer. The resistance across a set of scribed lines (e.g., in the direction perpendicular to the width) can be defined similarly to the resistance between a bus bar and a line in the electrically conductive layer. In this case, two lines can be defined, one on either side of the set of scribed lines, where the lines and the set of scribed lines are parallel to each other, and an edge of the substrate, and have a length equal to W. The resistance between the two lines will, in general, be equal to the sum of the resistance caused by the sheet resistance of the transparent electrically conducting layer material, and the resistance added by the set of scribed lines. $r_n$ is defined as the resistance added by the set of scribed lines. In other words, if two test contacts were connected to the electrically conductive layer along two lines on either side of the set of scribed lines, then they would measure a resistance equal to the sum of the resistance of the electrically conductive layer (roughly equal to ρ*l/A, where ρ is the bulk resistivity of the electrically conductive layer, l is distance between the test contacts, and A is there t is the thickness of the electrically conductive layer) and $r_n$ (the resistance from the pattern of scribed lines).

In the rectangular electrochromic device shown in FIG. 4, for a given desired sheet resistance in the top electrically conductive layer, R(x), and the top electrically conductive layer bus bar located at x=0, the parameters of the segments (303, 304, 305, 306 and 308) are chosen such that the resistance $r_n$ to the flow of electrons traversing the set of scribed lines $x_n$ in the x direction in the top electrically conductive layer is the value of the integral $$r_n = \int \{[R(x) - R_{TC}(x)]/W\} dx,$$

evaluated in the interval from $[x_{n-1}, x_n]$. It is also possible to evaluate the integral in the interval $[x_n, x_{n+1}]$ to evaluate $r_n$. Similarly, for a given desired sheet resistance in the bottom electrically conductive layer, R'(x), and the bottom electrically conductive layer bus bar located at x=x$_t$, the parameters of the segments (303, 304, 305, 306 and 308) are chosen such that the resistance $r'_n$ to the flow of electrons traversing the set of scribed lines $x_n$ in the x direction in the bottom electrically conductive layer is the value of the integral $$r'_n = \int \{[R'(x) - R_{TC}(x)]/W\} dx,$$

evaluated in the interval from $[x_{n+1}, x_n]$. It is also possible to evaluate the integral in the interval $[x_n, x_{n-1}]$ to evaluate $r'_n$.

Note that in some cases, the sets of scribed lines on the top electrically conductive layer do not need to coincide with the positions of the sets of scribed lines on the bottom electrically conductive layer. In such cases, there would be a set of positions of sets of scribed lines in the top electrically conductive layer $x_n$, and a set of positions of sets of scribed lines in the bottom electrically conductive layer $x'_n$, and the relationships above would otherwise remain unchanged. In any case, the relative distances of the sets of scribed lines from the bus bar on each layer can either be the same or different.

Figure 5:
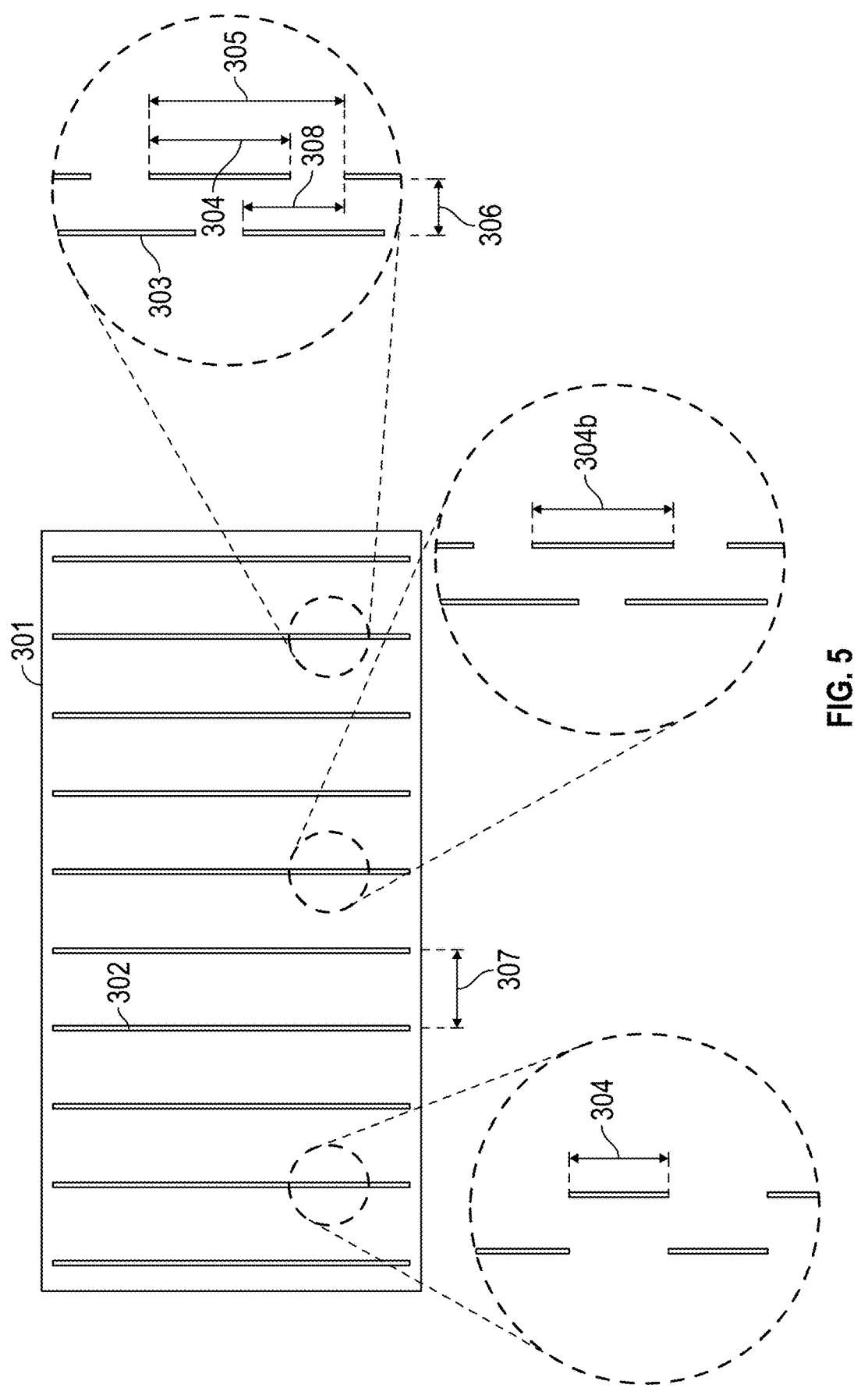
FIG. 5 is a schematic of a patterned electrically conductive layer 301 with a transparent conducting material with a number of sets of scribed lines 302, which are patterned into the transparent conducting material.

In order to approximate sheet resistances adhering to the above relationships between R(x) and R'(x), different sets of scribed lines will have different resistances to the flow of electrons in the x direction, and therefore the parameters of the segments (e.g., 303, 304, 305, 306 and/or 308) will vary between sets of scribed lines. FIG. 5 shows an example where the sets of scribed lines all contain 2 scribed lines. In this example, the period 305, the valve width 306 and the offset between segments in adjacent scribed lines 308 are all constant for every set of scribed lines $x_n$. However, the length of the scribed segments 304a, 304b and 304c are different for different sets of scribed lines. Therefore, the resistance to the flow of electrons traversing the set of scribed lines $x_n$ in the x direction will be different for different sets of scribed lines.

In general, the total resistance between the bus bar and a line in the electrically conductive layer is the sum of the resistance of the patterned features (e.g., sets of scribed lines in the example above), and the resistance of the transparent conductive material itself.

The resistance contribution of the patterned features (i.e., $r_n$) varies along the length of the substrate non-linearly with the non-uniform electrical properties. The resistance contribution from the patterned features per unit width of the device can be from about 0 to about 30 Ohm-cm, or from about 0 to about 300 Ohm-cm, or from about 0 to about 500 Ohm-cm, or from about 0 to about 750 Ohm-cm, or from about 0 to about 1000 Ohm-cm, or from about 0 to about 3000 Ohm-cm, or from about 0 to about 10000 Ohm-cm. In other words, for a substrate width of 100 cm, then the resistance contribution from the patterned features ($r_e$) would be from about 0 to about 0.3 Ohm, or from about 0 to about 3 Ohm, or from about 0 to about 5 Ohm, or from about 0 to about 7.5 Ohm, or from about 0 to about 10 Ohm, or from about 0 to about 30 Ohm, or from about 0 to about 100 Ohm.

The resistance contribution from the transparent conductive material per unit width of the device can be from about 0 to about 100 Ohm-cm, or from about 0 to about 300 Ohm-cm, or from about 0 to about 600 Ohm-cm, or from about 0 to about 1200 Ohm-cm, or from about 0 to about 1500 Ohm-cm, or from about 0 to about 1800 Ohm-cm, or from about 0 to about 2400 Ohm-cm, or from about 0 to about 3600 Ohm-cm, or from about 0 to about 4800 Ohm-cm, or from about 0 to about 12000 Ohm-cm. The resistance contribution per unit width from the transparent conductive material is driven by the distance to the bus bar, the thickness of the material and the sheet resistance of the material.

The dimensions of the patterned features drive the resistance contribution of the patterned lines. The length of the scribe lines (e.g., 304 in FIG. 4) can be from about 0.1 mm to about 100 mm, or from about 0.1 mm to about 20 mm, or from about 0.1 mm to about 10 mm, or from about 1 mm to about 10 mm, or from about 1 mm to about 20 mm, or from about 1 mm to about 100 mm, or from about 5 mm to about 10 mm, or from about 5 mm to about 15 mm, or from about 5 mm to about 20 mm, or from about 5 mm to about 25 mm, or from about 5 mm to about 30 mm. The period (e.g. 305 in FIG. 4) can be from about 2 mm to about 10 mm, or from about 2 mm to about 20 mm, or from about 2 mm to about 100 mm, or from about 5 mm to about 10 mm, or from about 5 mm to about 15 mm, or from about 5 mm to about 20 mm, or from about 5 mm to about 25 mm, or from about 5 mm to about 30 mm. The gap between scribed segments within a scribed line (e.g. the difference between 305 and 304 in FIG. 4) can be about 0.5 mm, or from about 0.1 to about 100 mm, or from about 0.5 to about 200 mm, or from about 0.1 to about 50 mm, or from about 0.1 to about 20 mm, or from about 0.1 to about 10 mm, or from about 0.1 to about 5 mm, or from about 0.1 to about 1 mm, or from about 0.1 to about 0.5 mm, or from about 0.2 to about 0.8 mm, or from about 0.4 to about 0.6 mm. The valve width (e.g. 306 in FIG. 4) can be from about 10 to about 1000 microns, or from about 10 to about 500 microns, or from about 10 to about 200 microns, or from about 50 to about 500 microns, or from about 50 to about 400 microns, or from about 50 to about 300 microns.

Figure 6:
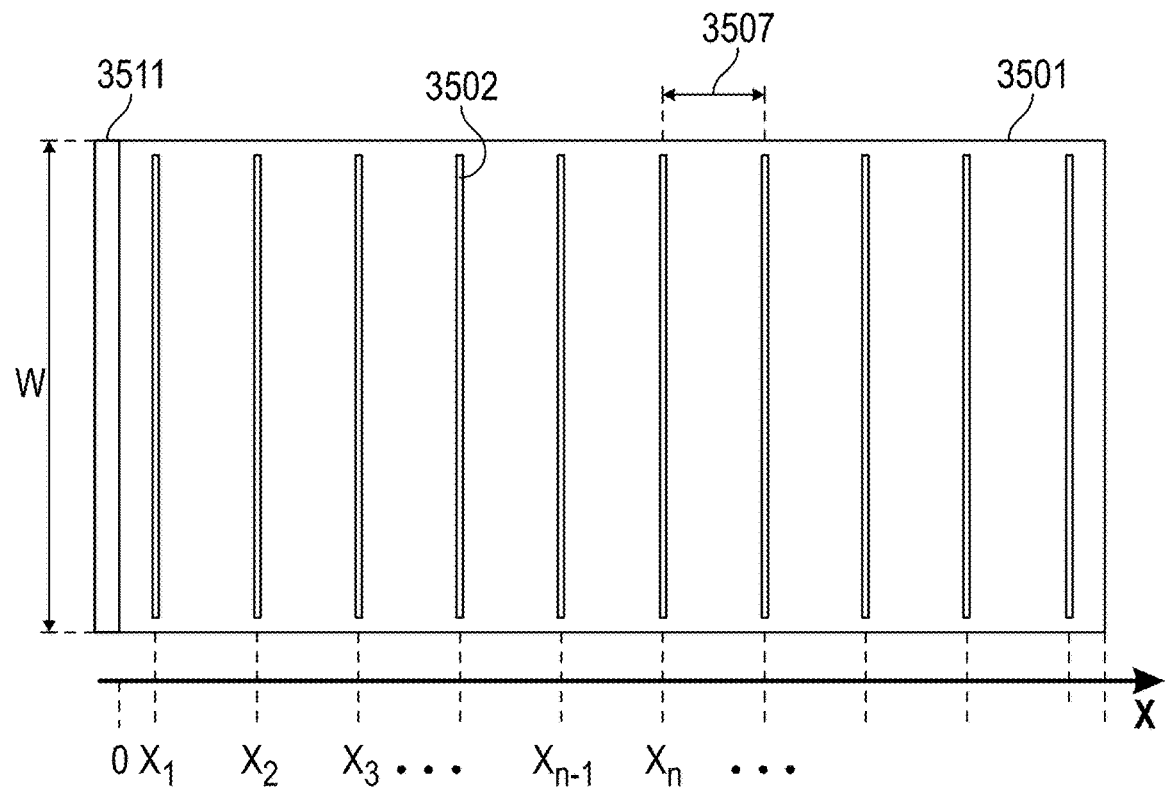
FIG. 6 is a schematic of a patterned electrically conductive layer 3501 with a transparent conducting material with a number of sets of scribed lines 3502 patterned into the transparent conducting material, and a bus bar 3511. Additionally, FIG. 6 includes a plot of resistance between the bus bar and a line parallel to the bus bar is (where the bus bar is at x=0, and the parallel line is at a position x) versus position (x), for different embodiments.
Figure 6:
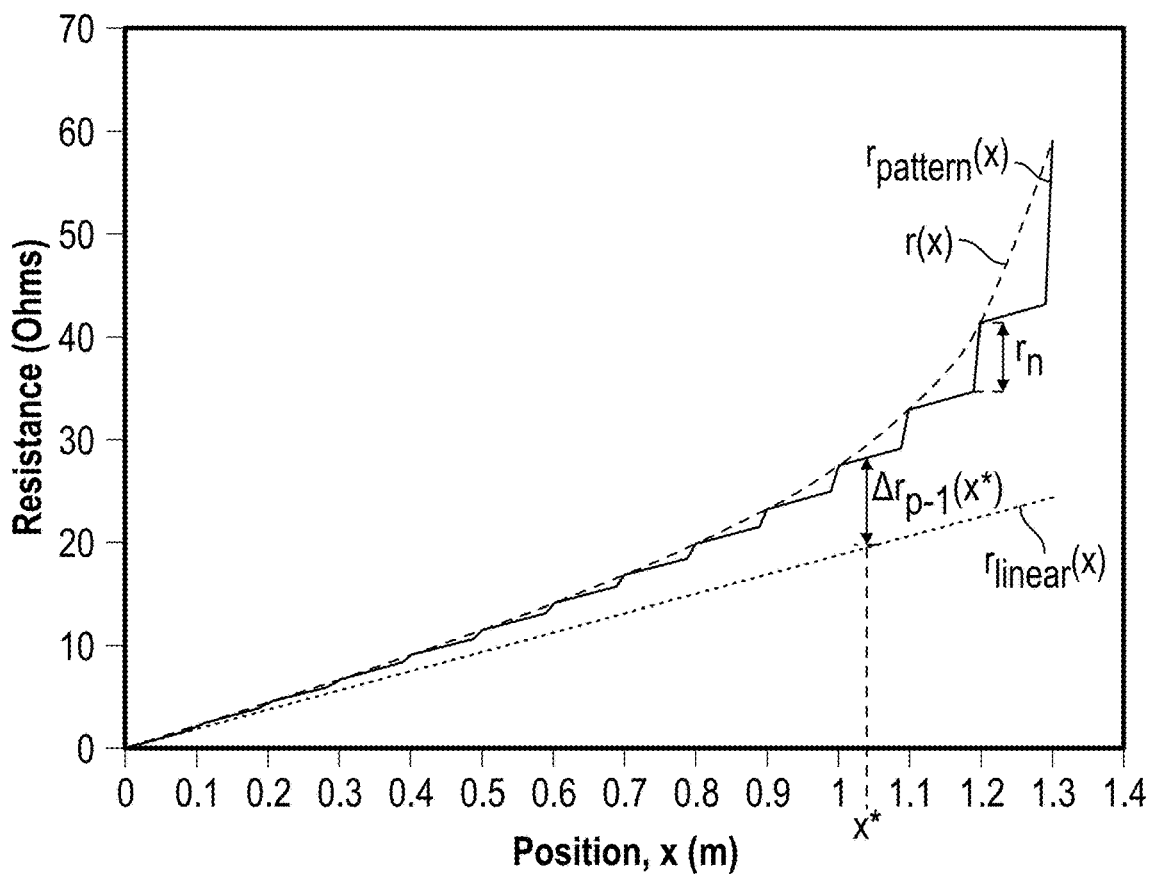

Given a substantially rectangular electrically conductive layer with a transparent conducting material of constant thickness and constant resistivity (and no patterning), the resistance between the bus bar and a line parallel to the bus bar is $r_{linear}(x)$ (where the bus bar is at x=0, and the parallel line is at a position x). $r_{linear}(x)$ increases linearly as x increases. Given a patterned electrically conductive layer of the geometry shown in FIG. 4, composed of a transparent conducting material of constant thickness and constant resistivity, and a pattern of sets of scribed lines, the resistance between the bus bar and a line parallel to the bus bar is $r_{pattern}(x)$ (where the bus bar is at x=0, and the parallel line is at a position x). $r_{pattern}(x)$ will equal $r_{linear}(x)$ with approximately step-wise increases in resistance (equal to $r_n$ as described above) at approximately the x-positions of the sets of scribed lines ($x_n$ as described above). FIG. 6 illustrates examples of $r_{linear}(x)$ and $r_{pattern}(x)$ vs. position x for the simple rectangular geometry described. An example of r(x), the resistance between the bus bar and a line parallel to the bus bar in the electrically conductive layer, calculated from a smoothly varying sheet resistance (e.g., R(x)) is also shown in FIG. 6 for reference. In some cases $r_{pattern}(x)$ will be similar to r(x) near the position of a set of scribed lines, or in between sets of scribed lines, depending on the intervals chosen for evaluating $r_n$. In some cases $r_{pattern}(x)$ at a given x position will always be higher or always be lower than r(x), depending on the intervals chosen for evaluating $r_n$.

Figure 7:
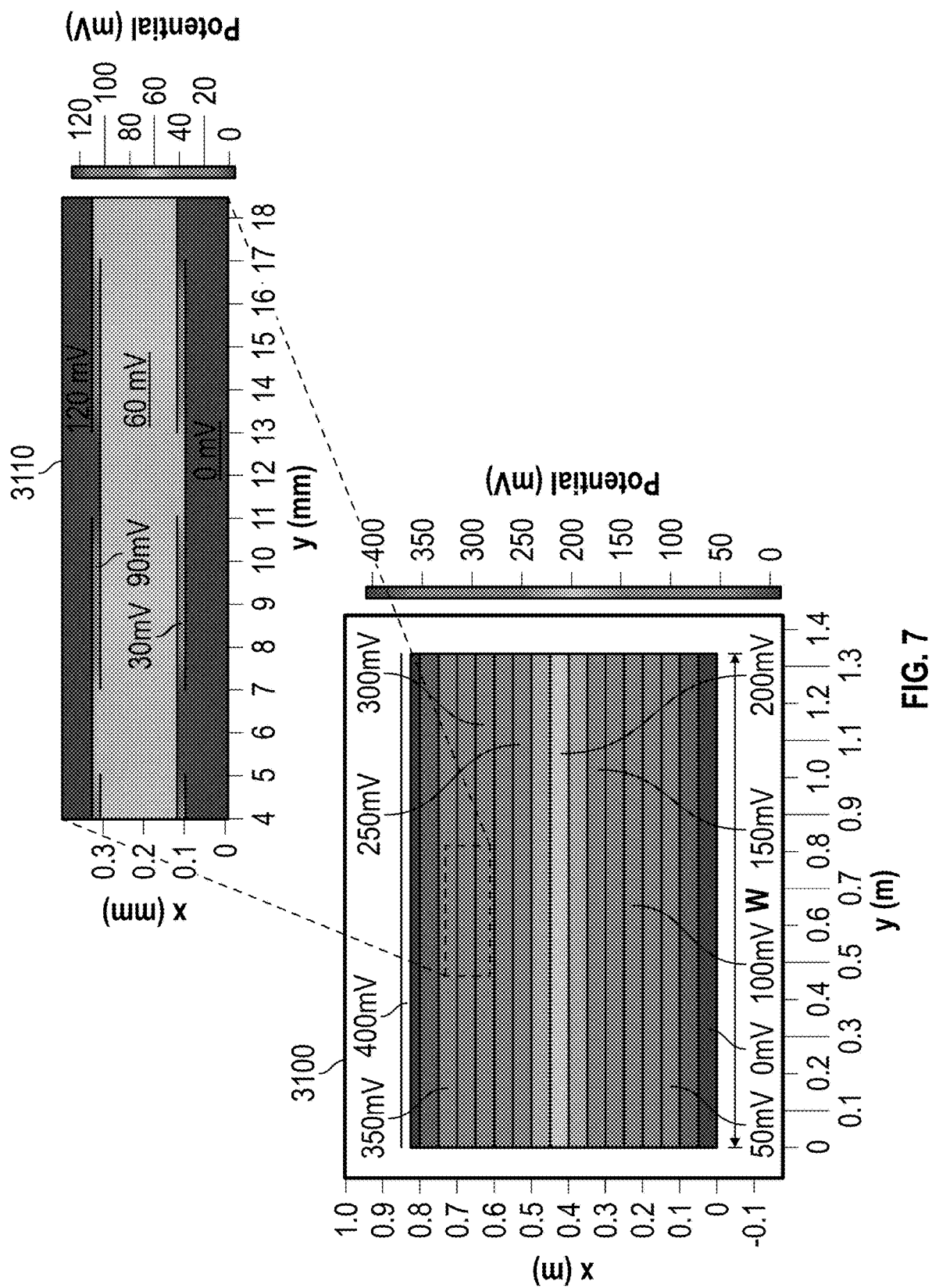
FIG. 7 shows simulated electrical potential maps of an exemplary patterned electrically conductive layer.

The resistance between the bus bar and (x,y) positions very close to sets of scribed lines, and in between individual scribed lines in a given set, is not only a function of x, but also can have a y-dependence. FIG. 7 shows simulated electrical potential maps of an exemplary patterned electrically conductive layer. The substrate in this example is approximately 800 cm long (in the x-direction), and 1300 cm wide (W=1300 cm, in the y-direction). There are approximately 16 sets of scribed lines in this example, and for simplicity, the dimensions of the patterned features are the same for all sets of scribed lines. The plot encompassing the whole device substrate 3100 illustrates that in some cases the potential is approximately constant in the y-direction for a given value of x. The potential for plot 3100 is shown in the color scale, and is the potential difference between the bus bar (in this example located at x approximately equal to 0 m) and an (x,y) location on the substrate, for an applied current per unit width equal to about 1 A-m (applied between a bus bar at x=0 and a second bus bar at x approximately equal to 800 cm), and varies between about 0 mV and approximately 400 mV.

The zoomed in plot 3110 illustrates that in some cases there are electrical potential gradients in the y-direction for locations close to the sets of scribed lines. The potential for plot 3110 is shown in the color scale, and is the potential difference between the bus bar (in this example located at x approximately equal to 0 m) and an (x,y) location on the substrate, for a given applied current per unit width equal to about 1 A-m (applied between a bus bar at x=0 and a second bus bar at x approximately equal to 0.38 cm), and varies between 0 mV and approximately 120 mV. Note that the distance between the sets of scribed lines in plot 3110 is smaller than that in plot 3100 in order to minimize computation time, however, the general features and conclusions remain valid. The zoomed in plot 3110 shows that the largest gradients in the y-direction occur in between each of the scribed lines within a set of scribed lines. In some cases the fraction of the device area where there are significant gradients in the y-direction is small, and therefore it is justified to neglect these gradients in the y-direction, and simplify the analysis to consider only gradients in the x-direction (as illustrated in the plot of the whole device substrate 3100). However, one skilled in the art will appreciate that all of the concepts described herein also apply to devices with significant potential gradients in both the x- and y-directions (e.g., in devices with sets of scribed lines that are non-linear, substrates that are non-rectangular, sets of scribed lines that are spaced very closely together, electrically conductive layers with spatially diminutive thickness non-uniformities, electrically conductive layers with spatially diminutive non-uniformities in electrical properties, etc.).

In some embodiments, care may be taken to design the sets of scribed lines to minimize the potential gradients in the y-direction. For patterns with sets of scribed lines such as those shown in FIG. 4, one or more of the ratios between segment length, period, valve width and pitch can be tuned to minimize the potential gradients in the y-direction.

In some embodiments, potential gradients in the y-direction can be controlled by varying the scribe patterns to establish visually perceptible patterns in the device (i.e., differences in the transmission at different locations in the device) during switching from a more transmissive state to a less transmissive state, or from a less transmissive state to a more transmissive state.

When the resistance gradients in the electrically conductive layers of the device are caused by scribe patterns, the resistance gradients can approximate a smoothly varying resistance profile, and the local cell potential can vary somewhat across the device. The geometry of the cell potential across the device can be tailored by changing the specific dimensions of the scribe patterns across the device. Since the local cell potential is the potential difference between the top and bottom electrically conductive layers, the alignment of the scribe patterns between the top and bottom electrically conductive layers will also affect the cell potential across the device. Furthermore, since the magnitude of the cell potential impacts the switching speed of the device, the alignment of the scribe patterns between the top and bottom electrically conductive layers can be tuned to create visually perceptible patterns as the device switches.

Referring back to FIG. 4, in some embodiments, the length of the collinear segments 304, the period 305, the valve width 306 and the offset between segments in adjacent scribed lines 308 that determine the resistance to the flow of electrons traversing a set of scribed lines in the x direction, can vary along the length of a set of scribed lines in the y-direction. By varying the resistance (to the flow of electrons in the x-direction) of the sets of scribed lines along the y-direction, the cell potential can be made non-uniform in the y-direction. The magnitude of the cell potential impacts the switching speed of the device, and therefore varying the scribe dimensions along the length of a set of scribed lines along the y-direction can create visually perceptible patterns in the device as it switches. Similarly, varying the resistance (to the flow of electrons in the x-direction) of the sets of scribed lines along the x-direction, the cell potential can be made non-uniform in the x-direction, and create visually perceptible patterns in the device as it switches. And similarly, varying the resistance (to the flow of electrons in the x-direction) of the sets of scribed lines along the x-direction and the y-direction, the cell potential can be made non-uniform in both the x-direction and y-direction, and create visually perceptible patterns in the device as it switches.

Figure 8:
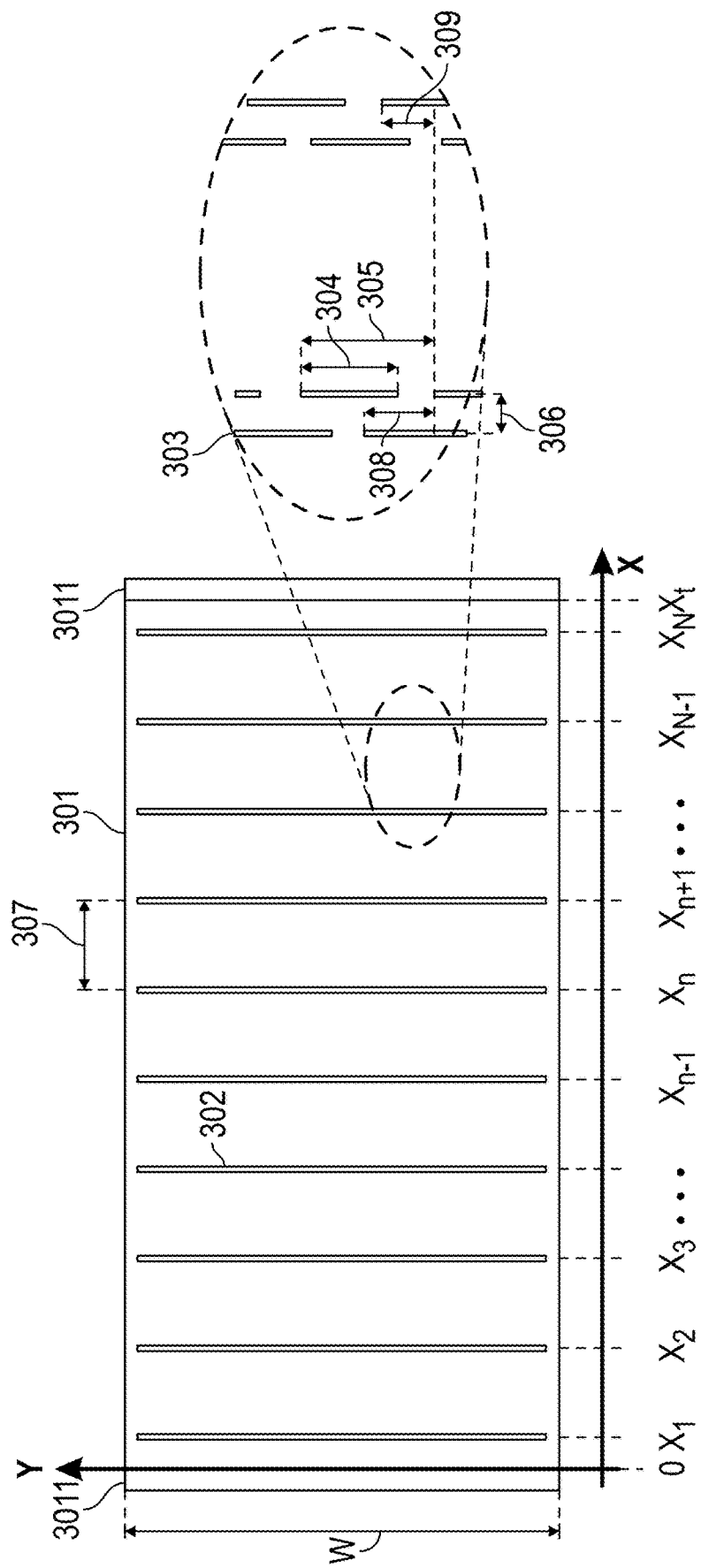
FIG. 8 is a schematic of a patterned electrically conductive layer 301 with a transparent conducting material with a number of sets of scribed lines 302, which are patterned into the transparent conducting material.

FIG. 8 illustrates another aspect of the scribe patterns that will create potential gradients in the x-direction and/or y-direction that cause visually perceptible patterns (i.e., differences in the transmission at different locations) in the device during switching from a more transmissive state to a less transmissive state, or from a less transmissive state to a more transmissive state. The period offset 309 will affect the uniformity of the transmission across different locations in the device. In some embodiments, as the period offset approaches zero, there will be smaller potential gradients in the x-direction and/or y-direction in the device, and as the period offset approaches half of the period 305, then there will be larger potential gradients in the x-direction and/or y-direction in the device. Consequently, in some embodiments, as the period offset approaches zero, there will be more uniform transmission across the device during switching, and as the period offset approaches half of the period 305, then there will be less uniform transmission across the device during switching.

The scribe patterns on the top and bottom electrically conductive layers can interact to create visually perceptible patterns in the device as it switches, and those patterns can vary across the area of the device. The patterns are the result of differences in transmission from one point to another. These transmission differences can be larger in one area of the device, and smaller in another area of the device. For example, the region of the device farther from the bus bars can have larger transmission differences and a more pronounced pattern than the regions nearer the bus bars.

Referring back to FIG. 4, in some embodiments, the visually perceptible patterns in the device as it switches are more pronounced in regions where the scribed segments do not overlap within the sets of scribed lines. The segments can be described as overlapping within the sets of scribed lines if their length 304 is greater than about half of the length of the period 305.

In some embodiments, the magnitude of the cell potential impacting the switching speed of the device can be varied by varying the scribe dimensions (i.e., the length of the collinear segments 304, the period 305, the valve width 306, the offset between segments in adjacent scribed lines 308, or the period offset 309) along the length of the sets of scribed lines in the y-direction and/or x-direction in the top electrically conductive layer, or the bottom electrically conductive layer, or both the top and bottom electrically conductive layer.

Many different patterns can be created while the device is switching by changing the resistance of the sets of scribed lines in the x-direction and/or y-direction, and/or by changing the alignment of the sets of scribed lines in the top and bottom electrically conductive layers. Some examples of patterns that can be created while the device is switching are checkerboard patterns (i.e., squares or rectangles of higher/lower transmission), honeycomb patterns (i.e., hexagons, or other polygons, of higher/lower transmission), vertical stripes, horizontal stripes, concentric rings, and other non-repeating patterns (e.g., company logos, words, or other shapes distributed across the area of the device). In some embodiments, the patterns are visible while the device is switching, but are not visible, or nearly invisible when the device is not switching.

The patterns are implemented to change the resistance profiles within the electrically conductive layers. $\Delta r_{p\text{-}l}(x)$ is the difference between the patterned electrically conductive layer resistance profile $r_{pattern}(x)$ and the linear uniform transparent conducting material resistance profile $r_{linear}(x)$. Another way to compare the resistance of a uniform and a patterned electrically conductive layer is by a ratio. The ratio of $\varphi(x)=r_{pattern}(x)/r_{linear}(x)$ will in general be a number equal to or greater than 1 for all values of x. In some cases the difference in resistance $\Delta r_{p\text{-}l}(x)$ will increase as the distance from the bus bar increases, and the ratio of the resistances $\varphi(x)=r_{pattern}(x)/r_{linear}(x)$ will increase as the distance from the bus bar increases.

FIG. 6 shows an example of $r_{linear}(x)$ for an electrically conductive layer with a uniform transparent conducting material, and $r_{pattern}(x)$ for a patterned electrically conductive layer with a uniform transparent conducting material and a pattern. FIG. 6 also shows the resistance r(x), resulting from a smoothly varying sheet resistance (as described above). The inset to FIG. 6 shows the patterned electrically conductive layer 3501 geometry for this example. The bus bar 3511 on the electrically conductive layer is at x=0, and the substrate is 1.3 m long and 0.8 m wide. The distance between the patterned features 3507 (e.g., the pitch between sets of scribed lines) is 0.1 m. The pattern in this example is chosen to approximate a hyperbolic increase in sheet resistance as the distance from the bus bar increases (e.g., wherein the scribe segment lengths in the sets of scribed lines close to x=0 are different than the scribe segment lengths in the sets of scribed lines close to x=$x_t$). Due to the discrete nature of the pattern, $r_{pattern}(X)$ has approximately step-wise increases in resistance due to the resistance from each pattern feature $r_n$. The difference between the patterned electrically conductive layer resistance $r_{pattern}(x)$ and the linear uniform transparent conducting material resistance $r_{linear}(x)$ at a particular value of x=x*, is shown in FIG. 6 as $\Delta r_{p\text{-}l}(x^*)$. Due to the approximately hyperbolic $r_n$ resistances in this example, $\Delta r_{p\text{-}l}(x)$ increases with increasing distance from the bus bar. Due to the nature of the $r_n$ resistances in this example, the ratio $\varphi(x)=r_{pattern}(x)/r_{linear}(x)$ will also increase with \ increasing distance from the bus bar.

As shown in FIG. 6, $r_{pattern}(x)$ is an approximation of r(x), as shown in FIG. 6. In some embodiments, a shorter pitch will decrease the difference between $r_{pattern}(x)$ and r(x). However, as previously noted, the resistance profile need not perfectly adhere to the $R'(x)=R(x)*(x_t/x-1)$ relationship to enable improved switching uniformity compared to devices with electrically conductive layers with constant sheet resistances. A discrete pattern (e.g., sets of scribed lines) is readily manufacturable, for instance using a scanning laser to ablate the electrically conductive material. The high speed and low cost of such a process are also benefits for high volume manufacturing. The patterns created by scanning laser ablation processes are also easy to modify for different sized devices, and the added flexibility is a benefit for the manufacturing of electrochromic windows and mirrors, which typically are manufactured in many different sizes. In some cases, the pitch can be chosen to be large to reduce the number of scribed lines, and increase manufacturability. In some cases, the pitch is adjusted to provide an acceptable difference between $r_{pattern}(x)$ and $r(x)$ with minimal number of scribes required during manufacturing.

Figure 9:
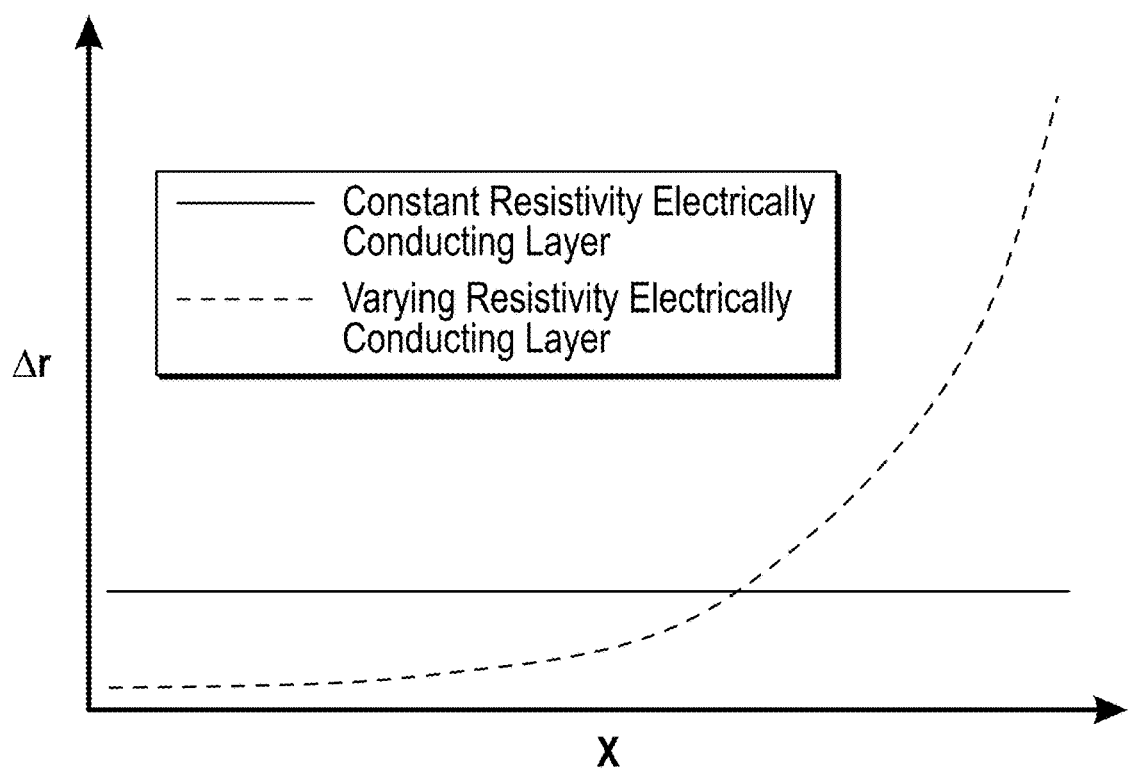
FIG. 9 is a plot of resistance between the bus bar and a line parallel to the bus bar is (where the bus bar is at x=0, and the parallel line is at a position x) versus position (x), for uniform and a varying electrically conductive layer embodiments.

In the case of an electrically conductive layer with constant resistivity (e.g. with a uniform transparent conducting material and no patterns), the resistance between the bus bar and a line parallel to the bus bar will be linear with the distance between the bus bar and the line (as described above). In this case, a fixed length interval between the bus bar and the parallel line can be defined ($\Delta x$). In this instance, the change in resistance, $\Delta r(x)$, over any interval $\Delta x$ will be constant. In the case of an electrically conductive layer with varying resistance (e.g. with patterned transparent conducting material) the change in resistance $\Delta r(x)$ over a fixed length interval $\Delta x$ will not be constant. FIG. 9 illustrates that the change in resistance $\Delta r$ over a fixed interval $\Delta x$ will be constant at all values of x for a uniform electrically conducting layer, and $\Delta r$ over a fixed interval $\Delta x$ varies with position (x) for a manufactured varying electrically conducting layer.

Additional Embodiments of Electrochromic Devices with Patterned Electrically Conductive Layers FIGS. 4 and 5 depict that each set of scribed lines 302 contains 2 scribed lines. Each set of scribed lines can have 2 or 3 or 4 or 5 or more scribed lines. The number of scribed lines in each set can also vary. In some cases, the spacing between the sets of scribed lines (i.e., the pitch) 307 can be constant, or varying.

Non-Uniform Thickness

The electrically conductive layer thickness and/or bulk resistivity can also be constant or varying. In this case, the relationship between the bulk resistivity and thickness of the top electrically conductive layer, and the bottom electrically conductive layer, is $$(L-x)*\rho(x)/t_f(x)=x*\rho'(x)/t_f'(x),$$

where x=0 is the position of the bus bar on the top electrically conducting layer, x=L is position of the bus bar on the bottom electrically conducting layer, $\rho(x)$ is the bulk resistivity of the top electrically conductive layer, $\rho'(x)$ is the bulk resistivity of the bottom electrically conductive layer, $t_f(x)$ is the thickness of the transparent conducting material of the top electrically conductive layer and $t_f'(x)$ is the transparent conducting material of the bottom electrically conductive layer. In this case $\rho(x)$, $\rho'(x)$, $t_f(x)$, and $t_f'(x)$ can all vary with position.

Figure 3:
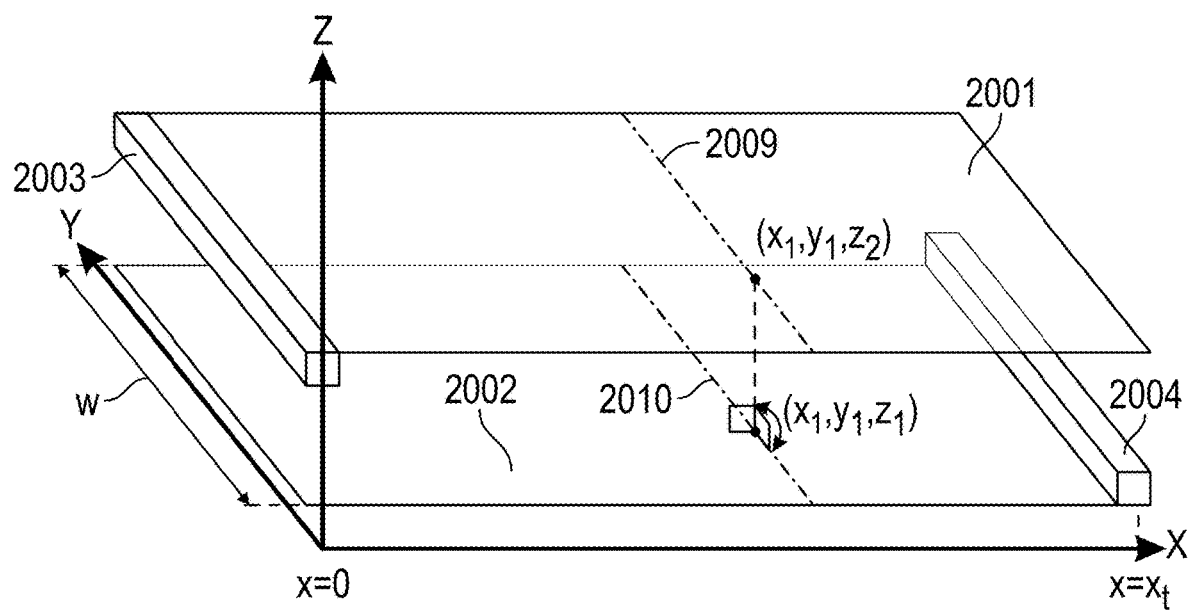
FIG. 3 is a schematic of a top electrically conductive layer 2001, a bottom electrically conductive layer 2002, a contact (bus bar 2003) to the top electrically conductive layer is made at x=0, and a contact (bus bar 2004) to the bottom electrically conductive layer is made at $x=x_t$. Additionally, FIG. 3 includes a plot of R(x), the sheet resistance of the top electrically conductive layer 2001 as a function of position (x), and R'(x), the sheet resistance of the bottom electrically conductive layer 2002 as a function of position (x), in an embodiment.
Figure 3:
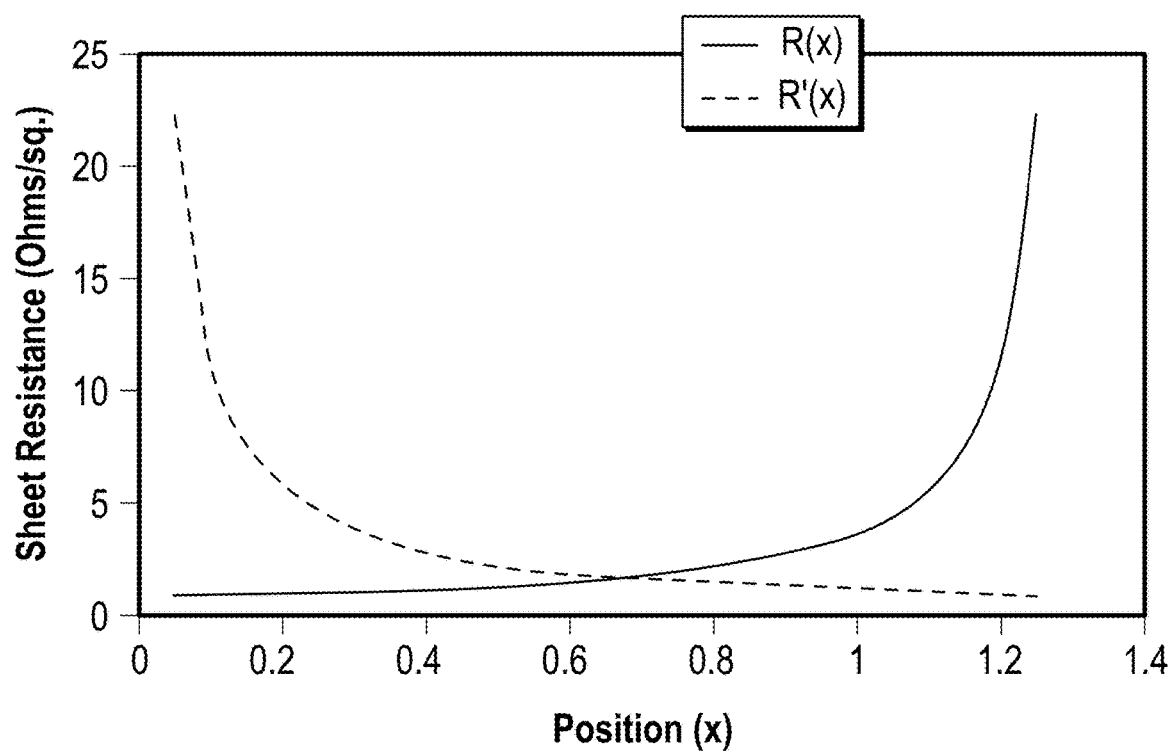

In this case the resistance between the bus bar 2003 and a line 2009 at position x for the top electrically conductive layer 2001 in FIG. 3 is the integral $$r(x)=\int[(\rho(x)/t_f(x))/W]dx,$$

evaluated in the interval from x=0 to x=x. The resistance between the bus bar 2004 and a line 2010 at position x for the bottom electrically conductive layer 2002 in FIG. 3 is the integral $$r'(x)=\int[(\rho'(x)/t_f'(x))/W]dx,$$

evaluated in the interval from $x=x_t$ to x=x.

Non-Rectangular Substrates

The above relationships to calculate resistances for rectangular geometries can be extended to calculate resistances for non-rectangular geometries. The sheet resistance of the top and bottom electrically conductive layers can be generalized to any electrode sheet resistance distribution that smoothly varies and any substrate geometry and contact configuration by the following relationship between the sheet resistance from one contact (g=0) to another (g=L) along gradient curves that are perpendicular to isoresistance lines, R(g), and the corresponding opposing electrode sheet resistance distribution R'(g), R'(g)=R(g)*(L/g−1). The resistance between a bus bar and a line (substantially along an isoresistance line) at position 'g' in this case is found from an integral of the sheet resistance divided by a dimension along the line (substantially along an isoresistance line) in the interval from the bus bar to the position of the line along the resistance gradient lines (that are perpendicular to isoresistance lines). In such embodiments, relationships similar to the ones developed above for the simple rectangular geometry also can be derived to define how to pattern an electrically conductive layer so that the resistance profile approximates that of a resistance profile of an electrically conductive layer with a smoothly varying sheet resistance. The advantage to following the relationships are that electrochromic devices with more uniform local cell potential will result, which will also have more uniform optical properties (e.g. transmission) during switching.

FIGS. 10A-10E depict contour maps of the sheet resistance, $R_s$, in an electrically conductive layer (i.e., the first electrically conductive layer, the second electrically conductive layer, or each of the first and second electrically conductive layers) as a function of (two-dimensional) position within the electrically conductive layer for several exemplary embodiments of an electrochromic stack in accordance with the present invention.

Figure 10A:
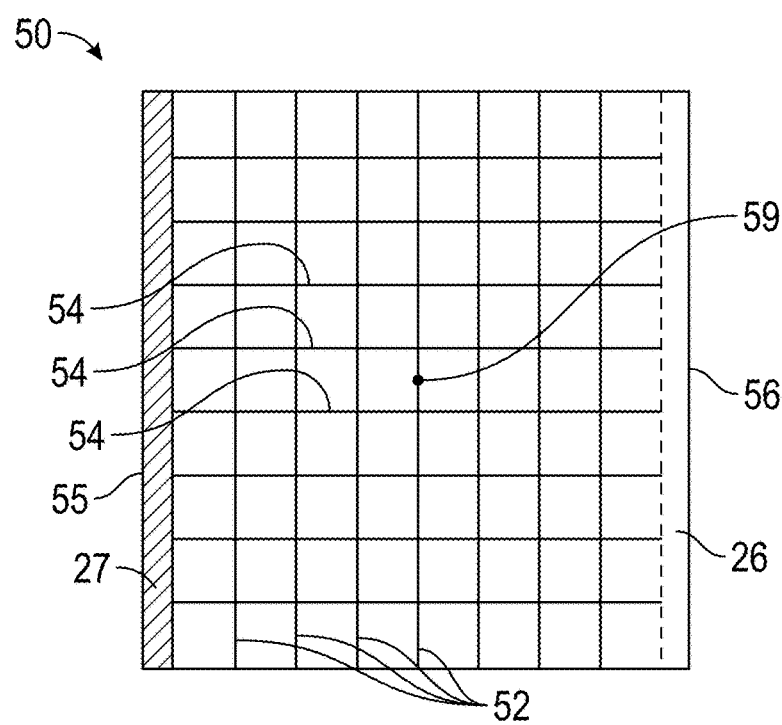
FIGS. 10A-10E are a series of contour maps of the sheet resistance, $R_s$, in the first and/or second electrically conductive layer as a function of position (two-dimensional) within the first and/or second electrically conductive layer showing isoresistance lines (also sometimes referred to as contour lines) and resistance gradient lines (lines perpendicular to the isoresistance lines) resulting from various alternative arrangements of bus bars for devices having square and circular perimeters.
Figure 10B:
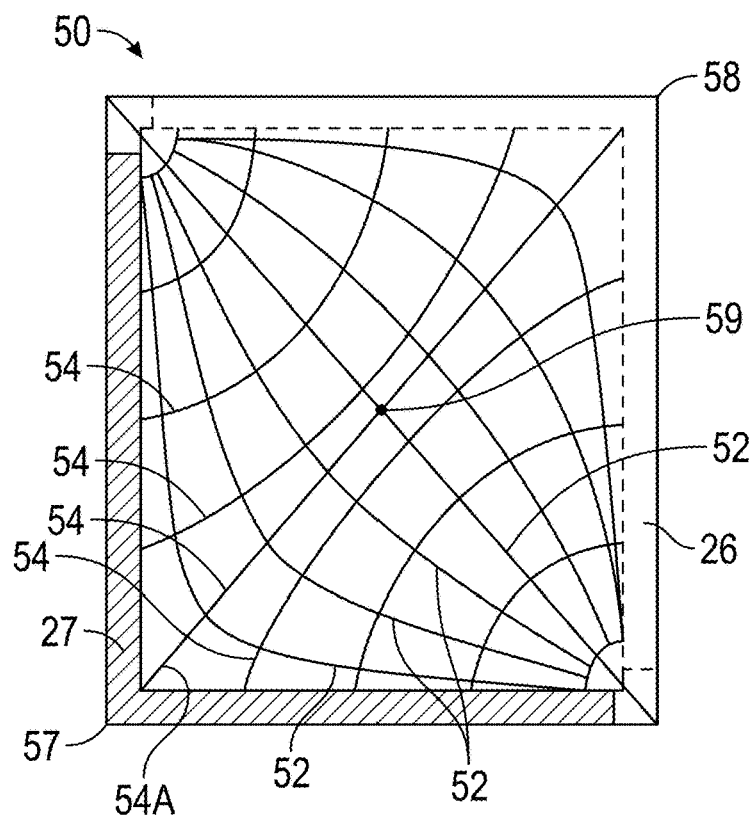
Figure 10C:
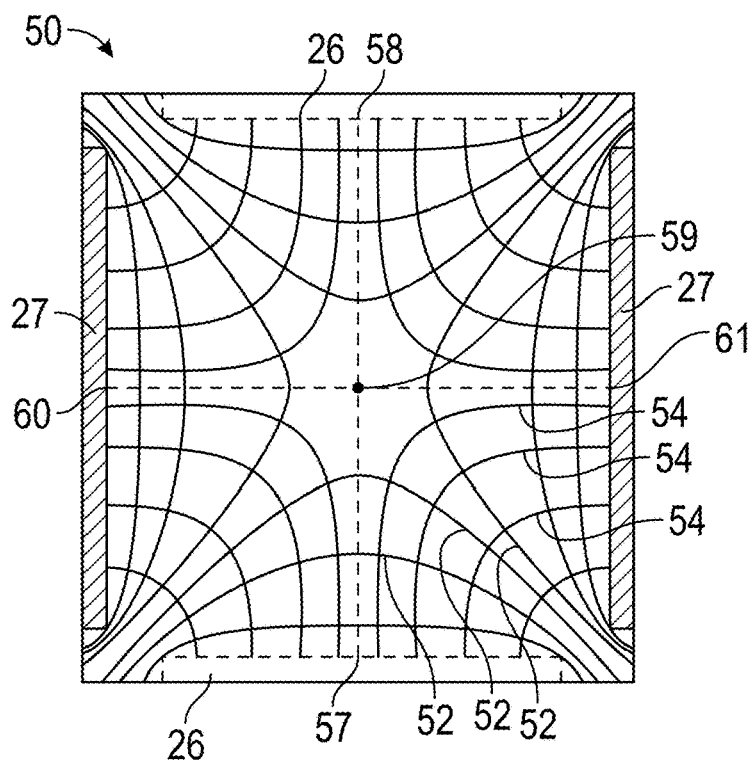
Figure 10D:
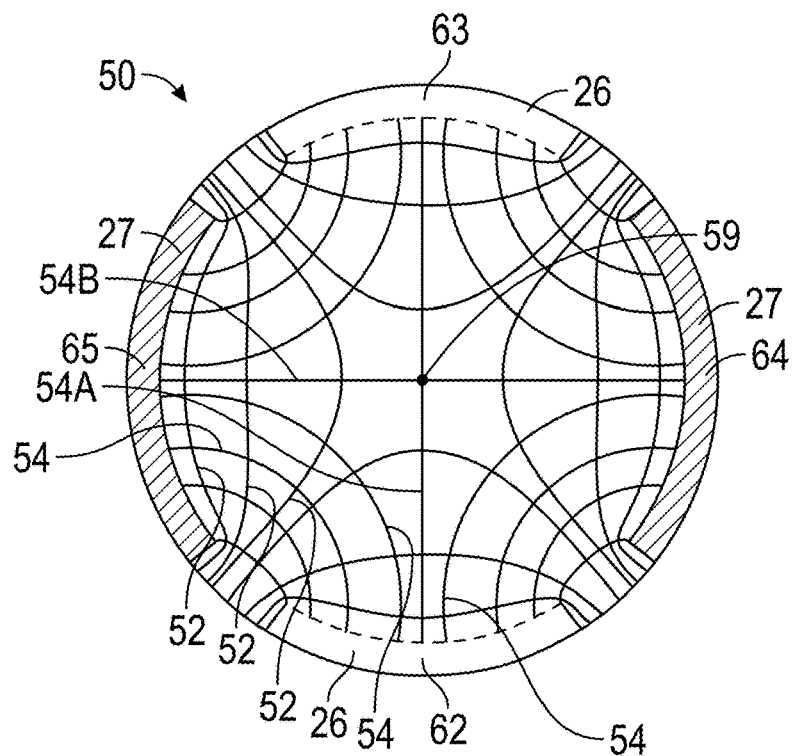
Figure 10E:
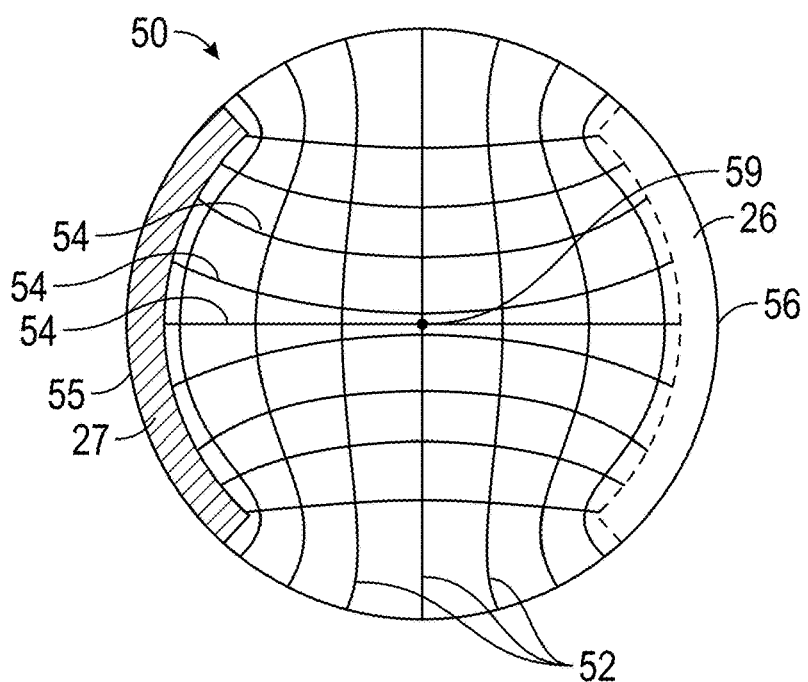
Figure 11A:
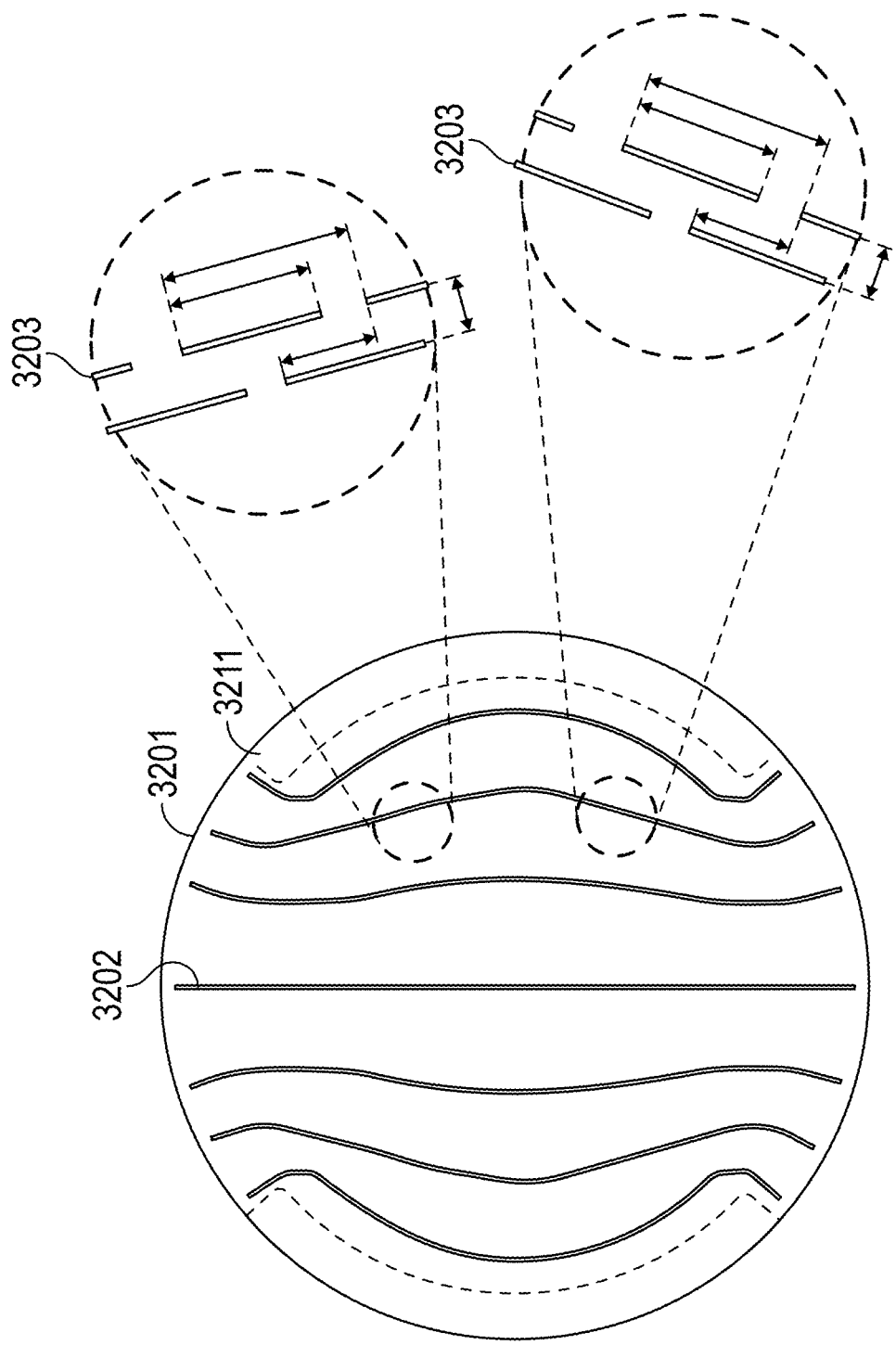
FIGS. 11A-11C are a series of schematics of a patterned electrically conductive layer 3201 with a transparent conducting material with a number of sets of scribed lines 3202, which are patterned into the transparent conducting material. The dark areas forming the patterns of lines in the magnified regions in FIGS. 11A-11C represent gaps in the electrically conductive layer.

An example of a substrate of a non-rectangular shape is shown in FIG. 10E. The bus bars 26 and 27 in FIG. 10E are at either side of the circular substrate. The resistance gradient can be created in this case by sets of scribed lines 3202 along the isoresistance lines as shown in FIG. 11A. In this example, the scribed lines are at different angles that follow the contours of the isoresistance lines. The dimensions of the segments and other parameters in the sets of scribed lines are chosen to create the resistance gradients according to the relationships above in order to create a more uniform local cell potential. The more uniform local cell potential will enable the electrochromic device to switch more uniformly.

Figure 11B:
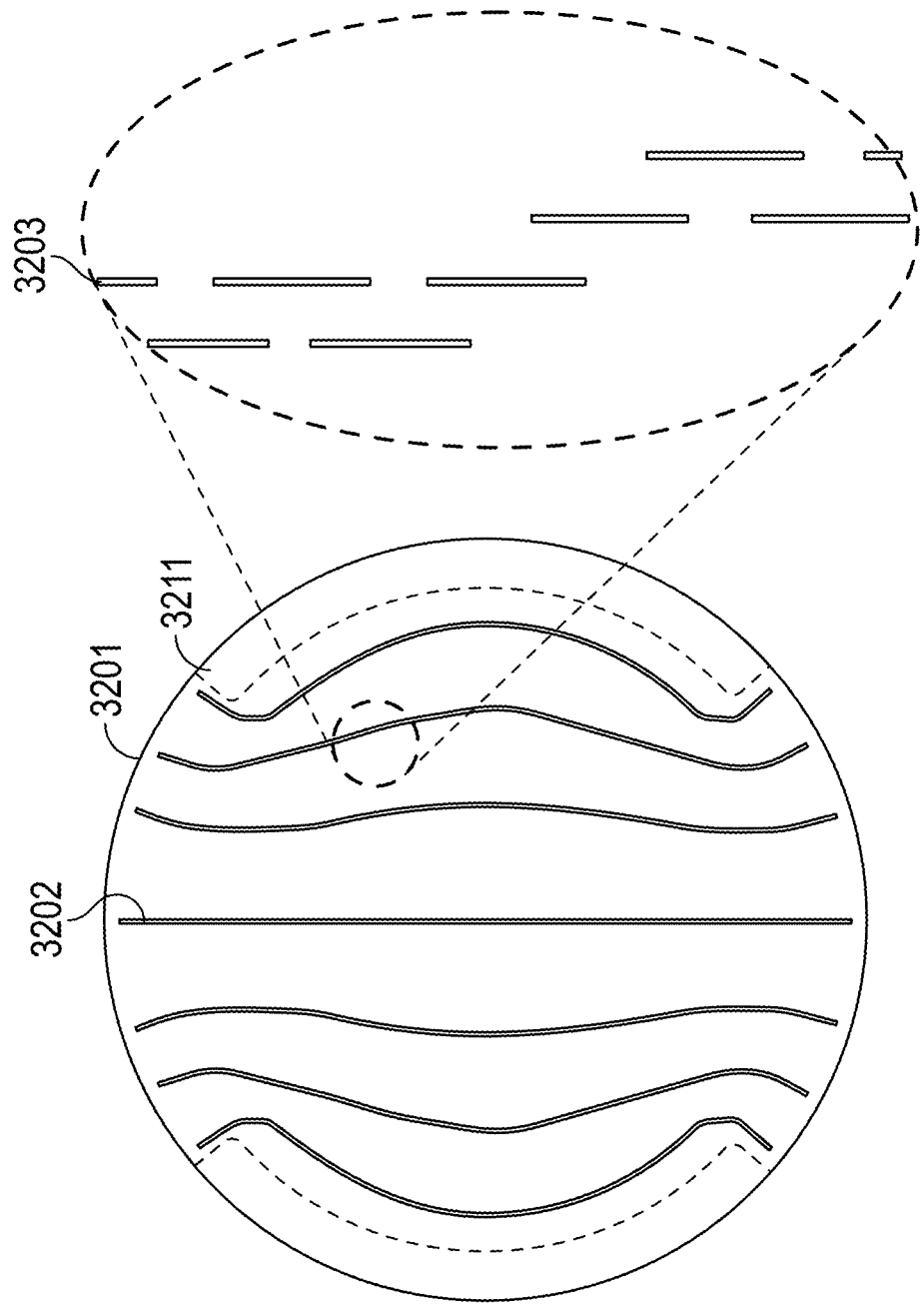

Another example of sets of scribed lines that can create the resistance gradients of the substrate in FIG. 10E are the sets of scribed lines 3202 along the isoresistance lines as shown in FIG. 11B. In this example, the scribed lines are all parallel but follow the contours of the isoresistance lines by using more than 2 scribed lines per set of scribed lines in a given isoresistance line. Again, the dimensions of the segments and other parameters in the sets of scribed lines are chosen to create the resistance gradients according to the relationships above in order to create a more uniform local cell potential, which will enable the electrochromic device to switch more uniformly.

Figure 11C:
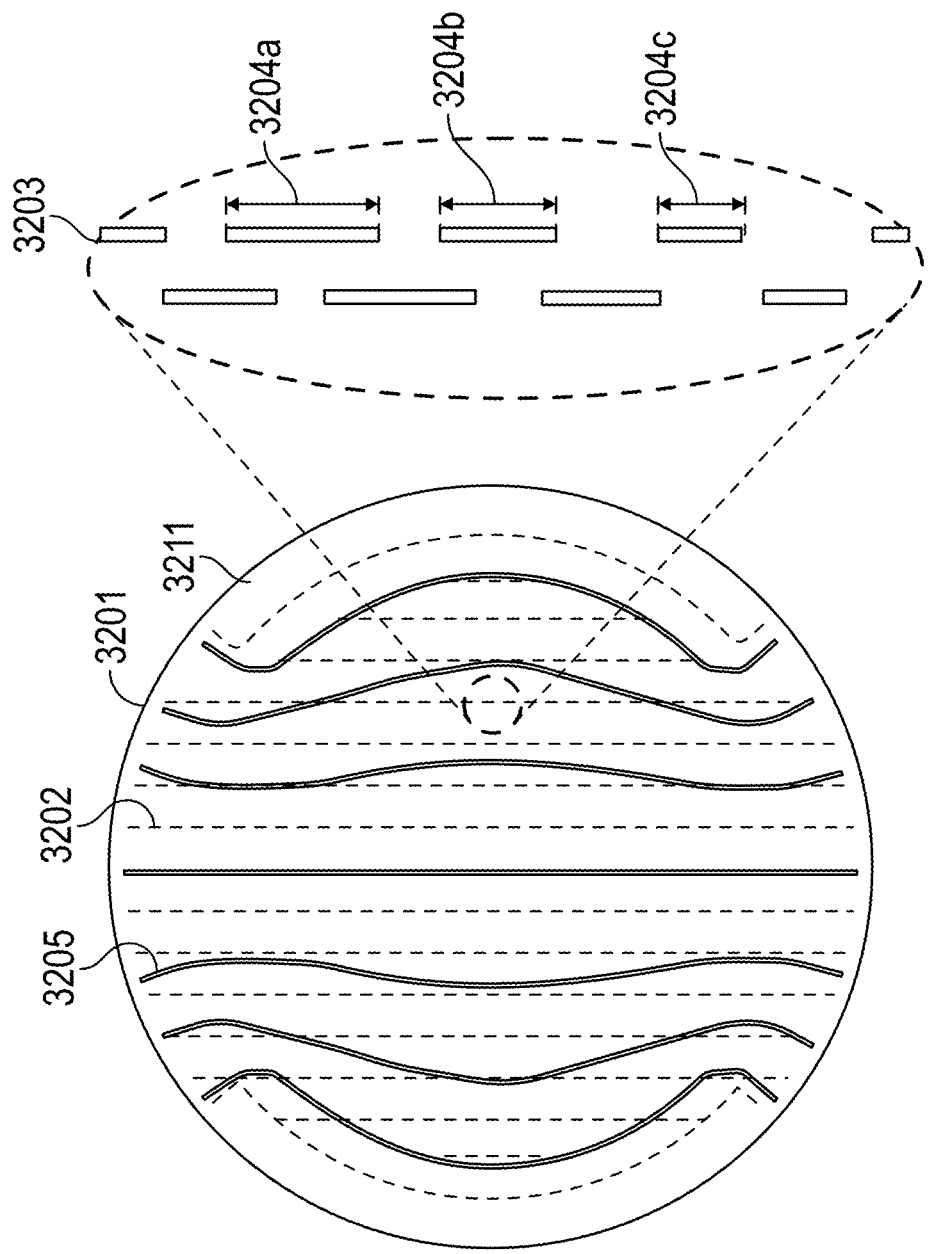

One example of a substrate of a non-rectangular shape is shown in FIG. 10E. The bus bars 26 and 27 in FIG. 10E are at either side of the circular substrate. The resistance gradient can be created in this case by sets of scribed lines 3202 as shown in FIG. 11C. In this example, the scribed lines are parallel (i.e., do not follow the isoresistance lines 3205) but the length of the segments in the scribed lines (e.g. 3204a, 3204b and 3204c) vary along a set of scribed lines to create the resistance gradients required. The dimensions of the segments and other parameters in the sets of scribed lines are chosen to create the resistance gradients according to the relationships above in order to create a more uniform local cell potential. The more uniform local cell potential will enable the electrochromic device to switch more uniformly.

In each of FIGS. 10A-10E, contour map 50 depicts a set of sheet isoresistance curves 52 (i.e., curves along which the sheet resistance, $R_s$, has a constant value) and a set of resistance gradient curves 54 that are perpendicular to isoresistance curves 52 resulting from an electrochromic stack having a perimeter that is square (FIGS. 10A, 10B, and 10C) or circular (FIGS. 10D and 10E) and varying numbers and locations of bus bars 26 and 27 in contact with the first and second electrically conductive layers (not labeled) of the electrochromic stack. In FIG. 10A, the direction of the set of gradients 54 indicates that the sheet resistance, $R_s$, within the electrically conductive layer progressively increases along the set of gradients 54 and between west side 55 and east side 56 of the electrically conductive layer in contact with bus bar 27. In FIG. 10B, the direction of gradient 54A indicates that the sheet resistance, $R_s$, within the electrically conductive layer in contact with bus bar 27 progressively decreases from southwest corner 57 to centroid 59 and then decreases from centroid 59 to northeast corner 58. In FIG. 10C, the direction of the set of gradients 54 indicate that the sheet resistance, $R_s$, within the electrically conductive layer in contact with bus bar 27 progressively decreases from the west side 60 and east side 61 to centroid 59 and progressively increases from the top side 58 and bottom side 57 to centroid 59; stated differently, sheet resistance, $R_s$, forms a saddle like form centered around centroid 59. In FIG. 10D, the direction of gradients 54a and 54b indicates that the sheet resistance, $R_s$, within the electrically conductive layer in contact with bus bar 27 progressively decreases from each of positions 64 and 65 to centroid 59 and progressively increases from each of positions 63 and 62 to centroid 59; stated differently, sheet resistance, $R_s$, forms a saddle like form centered around centroid 59. In FIG. 10E, the direction of the set of gradients 54 indicates that the sheet resistance, $R_s$, within the electrically conductive layer in contact with bus bar 27 progressively decreases from the west side 55 to the east side 56.

In general, electrical circuit modeling may be used to determine the sheet resistance distribution providing desired switching performance, taking into account the type of electrochromic device, the device shape and dimensions, electrode characteristics, and the placement of electrical connections (e.g., bus bars) to the voltage source. The resistance distribution to approximate the desired sheet resistance distribution, in turn, can be controlled, at least in part, by patterning the first and/or second electrically conductive layer(s), and optionally grading the thickness of the first and/or second electrically conductive layer(s), grading the composition of the first and/or second electrically conductive layer(s), or some combination of these.

First and Second Electrically Conductive Layer Variations

In some examples, to facilitate more rapid switching and/or more uniform switching of electrochromic device 1 from a state of relatively greater transmittance to a state of relatively lesser transmittance, or vice versa, at least one of electrically conductive layers 22, 23 has a patterned layer. By way of further example, one of first and second electrically conductive layers 22, 23 can be a patterned layer and the other can be a layer with a graded thickness or graded composition as described herein. Alternatively, the first electrically conductive layer 22 and second electrically conductive layer 23 can both be patterned.

In another example, the electrochromic device is an electrochromic window, where (referring to FIG. 1) the first substrate 24 and second substrate 25 are panes of glass or other transparent substrate and electrochromic device 1 has two bus bars 26, 27 located on opposite sides of first electrode layer 20 and second electrode layer 21, respectively. Additionally, the first electrically conductive layer is patterned such that the resistance to the flow of electrons in the first electrically conductive layer 22 that generally increases non-linearly (e.g., approximating a hyperbolically varying sheet resistance) with increasing distance from bus bar 26, and/or the second electrically conductive layer is patterned such that the resistance to the flow of electrons in the second electrically conductive layer 23 generally increases non-linearly (e.g., approximating a hyperbolically varying sheet resistance) with increasing distance from bus bar 27.

Electrochromic Device with Patterned Electrically Conductive Layer and Redox Elements In some embodiments, an electrochromic (EC) device has one or more non-uniform electrically conductive layers, and a redox element, where the redox element sequesters charge from one or more layers comprising the electrochromic device. In some cases, the redox element sequesters charge to mitigate or prevent performance degradation of the electrochromic device resulting from faradaic losses. In some cases, the redox element sequesters charge to mitigate or prevent a decrease in the photopic ratio of the electrochromic device.

In some embodiments, the redox element is an active redox element, wherein the active redox element is electrically connected to one or more auxiliary electrodes, and sequesters charge from the other layers of the electrochromic device in response to a potential applied through the auxiliary electrode(s) coupled to auxiliary control circuitry. The auxiliary electrode(s) are electrically isolated from the electrically conductive layers, which apply potential to the anode(s) and cathode(s) of the EC device to switch the EC device from a more transmissive state to a less transmissive state, thereby allowing a sequestration potential to be applied independently from the potential between the anode and cathode of the EC device.

In different cases, the redox element can be located laterally adjacent to (i) the first electrically conductive layer, (ii) the first electrode layer, (iii) the ion conductor layer, (iv) the second electrode layer, and/or (v) the second electrically conductive layer.

In some cases, an electrochromic device has a redox element, and a first and second electrically conductive layer, and the device area is approximately quadrilateral, and one bus bar is connected to each of the two electrically conductive layers in such a way that they are oriented along two opposing edges of the quadrilateral device. The redox elements can also be positioned along one side of one or both substrates, on the opposite side from, or adjacent side to, or on the same side as the bus bars on one or both substrates. The redox elements can also be located on more than one edge of one or both substrates, and are located on sides opposite from, adjacent to, or the same side as bus bars on one or both substrates. There can also be more than 2 redox elements, which are located on 1, 2, 3 or 4 sides of the quadrilateral, and on one or both substrates. The redox elements can also form an "L" shape, and span 2 adjacent sides of the quadrilateral. There can also be 1, 2, or more than 2 redox elements configured in different combinations described herein. For example, there may be 2 redox elements in "L" shapes, where each spans 2 adjacent sides of the quadrilateral, and are located on different substrates, plus 2 redox elements located along a single side, each one sharing the substrate with an "L" shaped redox element.

The four sides of the quadrilateral of the first substrate can be designated sides A, B, C and D, where sides A and B meet at a vertex, sides B and C meet at a vertex, sides C and D meet at a vertex, and sides D and A meet at a vertex of the first substrate, and the four sides of the quadrilateral of the second substrate are designated sides A', B', C' and D', wherein sides A' and B' meet at a vertex, sides B' and C' meet at a vertex, sides C' and D' meet at a vertex, and sides D' and A' meet at a vertex of the second substrate. The two substrates can be joined to form an electrochromic device, and the two substrates rotated such that sides A and A' are parallel and nearest to one another, sides B and B' are parallel and nearest to one another, sides C and C' are parallel and nearest to one another, and sides D and D' are parallel and nearest to one another. In other words, one roughly rectangular substrate of the EC device ABCD has edges A, B, C and D, and a second roughly rectangular substrate of the EC device A'B'C'D' has edges A', B', C' and D', and edges A and A' are parallel and nearest and edges C and C' are parallel and nearest when the two substrates are assembled into a device. In such cases, the first bus bar may be located along edge A of the first substrate, and the second bus bar may be located along edge C' of the second substrate. There may also be one redox element located on side A, or B, or C, or D of the first substrate, or on side A', or B', or C', or D' of the second substrate. There may also be more than one redox element located on sides A, and/or B, and/or C, and/or D of the first substrate, and/or on sides A', and/or B', and/or C', and/or D' of the second substrate. There may also be more than 2 redox elements located on 1, 2, 3 or 4 sides of the quadrilateral, and on sides A, and/or B, and/or C, and/or D of the first substrate, and/or on sides A', and/or B', and/or C', and/or D' of the second substrate. The redox elements may also form an "L" shape, and span 2 adjacent sides of the quadrilateral, and be located on sides A and B, and/or B and C, and/or C and D, and/or D and A of the first substrate, and/or on sides A' and B', and/or B' and C', and/or C' and D', and/or D' and A' of the second substrate. There may also be 1, 2, or more than 2 redox elements configured in different combinations described herein. For example, there may be 2 redox elements in "L" shapes, where each spans 2 adjacent sides of the quadrilateral, and are located on different substrates (e.g., sides A and B, and/or B and C, and/or C and D, and/or D and A of the first substrate, and on sides A' and B', and/or B' and C', and/or C' and D', and/or D' and A' of the second substrate), plus 2 redox elements located along a single side, each one sharing the substrate with an "L" shaped redox element (e.g., side A, or B, or C, or D of the first substrate, and side A', or B', or C', or D' of the second substrate).

As described herein, the electrically conductive layers can be non-uniform to facilitate a more uniform cell potential and more uniform transmission across an electrochromic device as it switches (i.e., a reduced iris effect). In some embodiments, there is a potential drop along the electrically conductive layer as the distance between the bus bar and a point on the electrically conductive layer increases. In order for a potential to be applied to the redox element, it can be electrically isolated from the electrically conductive layer. In some cases, this isolation is achieved by a gap created between the electrically conductive layer and the redox element(s). In some cases, this gap is a laser scribed channel in the transparent conductive material making up the electrically conductive layer. In some embodiments, it can be advantageous for the redox elements to be located along the same edges as the bus bars, because the potential difference between any redox element location and the adjacent electrically conductive layer will be roughly constant along the edges.

Referring to the quadrilateral substrate definitions above, where one roughly rectangular substrate of the EC device ABCD has edges A, B, C and D, and a second roughly rectangular substrate of the EC device A'B'C'D' has edges A', B', C' and D', and edges A and A' are parallel and nearest and edges C and C' are parallel and nearest when the two substrates are assembled into a device, in some embodiments, the first bus bar is located along edge A of the first substrate, the second bus bar is located along edge C' of the second substrate, the electrically conductive layers are non-uniform, and the redox elements are located along edges A, C, A' and/or C'. For example, in some embodiments, if the first bus bar is located along edge A of the first substrate, the second bus bar is located along edge C' of the second substrate, the electrically conductive layers are non-uniform, and the redox element(s) are located along edges A and C, then the redox element(s) along edge A will have the same potential difference (between the redox element and the adjacent electrically conductive layer) all along edge A, and the redox element(s) along edge C will have the same potential difference (between the redox element and the adjacent electrically conductive layer) all along edge C. This is because in the cases where the electrically conductive layers are non-uniform to facilitate a more uniform cell potential and more uniform transmission across an electrochromic device as it switches, the equipotential lines in the electrically conductive layers are parallel to the bus bars (i.e., parallel to edges A and C). As a counter example, if the redox elements in this example were located along edge B, and a similar potential were applied between each of the redox elements and one of the bus bars, then the potential difference between the redox element(s) and the adjacent electrically conductive layer would be larger close to the bus bar (e.g., on edge B, closer to edge A), and smaller far from the bus bar (e.g., on edge B, nearer edge C).

In some embodiments, one or more portions of the electrode opposite the redox elements is electrically isolated from the bulk of the electrode. For example, one roughly rectangular substrate ABCD has edges A, B, C and D, and a second roughly rectangular substrate A'B'C'D' has edges A', B', C' and D', and edges A and A' are parallel and nearest and edges C and C' are parallel and nearest when the two substrates are assembled into a device, the first bus bar is located along edge A of the first substrate, the second bus bar is located along edge C' of the second substrate, the electrically conductive layers are non-uniform, the redox element(s) are located along edges A and C, and portion(s) of the electrode along edge A' (opposite the redox element(s) along edge A) are electrically isolated from the bulk of the electrode on the substrate ABCD, and portion(s) of the electrode along edge C' (opposite the redox element(s) along edge C) are electrically isolated from the bulk of the electrode on the substrate A'B'C'D'. In some cases, one or more portions of the electrode and electrically conductive layer opposite the redox elements is electrically isolated from the bulk of the electrode.

Values of Resistance Gradients

In some embodiments, the sheet resistance profile on one or both electrically conductive layers varies approximately from 1 Ohms/square to 10000 Ohms/square, or from 1 Ohms/square to 5000 Ohms/square, or from 10 Ohms/square to 10000 Ohms/square, or from 10 Ohms/square to 5000 Ohms/square, or from 1 Ohms/square to 1000 Ohms/square, or from 10 Ohms/square to 1000 Ohms/square.

In some embodiments, the average ratio of $r_{pattern}(x)/r_{linear}(x)$ in the first electrically conductive layer is at least about 1.1, or at least about 1.25, or at least about 1.5, or at least about 2, or at least about 3, or at least about 5, or at least about 10, or at least about 50, or at least about 100, or at least about 300, or from about 1.1 to about 1.25, or from about 1.1 to about 2, or from about 1.1 to about 3, or from about 1.1 to about 5, or from about 1.1 to about 10, or from about 1.1 to about 20, or from about 1.1 to about 30, or from about 1.1 to about 50, or from about 1.1 to about 100, or from about 1.1 to about 300.

In some embodiments, the average ratio of $r_{pattern}(x)/r_{linear}(x)$ in the second electrically conductive layer is at least about 1.1, or at least about 1.25, or at least about 1.5, or at least about 2, or at least about 3, or at least about 5, or at least about 10, or at least about 50, or at least about 100, or at least about 300, or from about 1.1 to about 1.25, or from about 1.1 to about 2, or from about 1.1 to about 3, or from about 1.1 to about 5, or from about 1.1 to about 10, or from about 1.1 to about 20, or from about 1.1 to about 30, or from about 1.1 to about 50, or from about 1.1 to about 100, or from about 1.1 to about 300.

In some embodiments, the average ratio of $r_{pattern}(x)/r_{linear}(x)$ in the first electrically conductive layer is at least about 1.1 or at least about 1.25, or at least about 1.5, or at least about 2, or at least about 3, or at least about 5, or at least about 10, or at least about 50, or at least about 100, or at least about 300, or from about 1.1 to about 1.25, or from about 1.1 to about 2, or from about 1.1 to about 3, or from about 1.1 to about 5, or from about 1.1 to about 10, or from about 1.1 to about 20, or from about 1.1 to about 30, or from about 1.1 to about 50, or from about 1.1 to about 100, or from about 1.1 to about 300, and the average ratio of $r_{pattern}(x)/r_{linear}(x)$ in the second electrically conductive layer is at least about 1.1, or at least about 1.25, or at least about 1.5, or at least about 2, or at least about 3, or at least about 5, or at least about 10, or at least about 50, or at least about 100, or at least about 300, or from about 1.1 to about 1.25, or from about 1.1 to about 2, or from about 1.1 to about 3, or from about 1.1 to about 5, or from about 1.1 to about 10, or from about 1.1 to about 20, or from about 1.1 to about 30, or from about 1.1 to about 50, or from about 1.1 to about 100, or from about 1.1 to about 300.

In some embodiments, the average $\Delta r_{p-l}(x)$ in the first and/or second electrically conductive layer per unit width of the device is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. In some embodiments, $\Delta r_{p-l}(x)$ in the first electrically conductive layer generally increases as the distance from the bus bar increases. In some embodiments, $\Delta r_{p-l}(x)$ in the first electrically conductive layer increases hyperbolically as the distance from the bus bar increases.

In some embodiments, the average $r_n$ in the first and/or electrically conductive layer per unit width of the device at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m.

Figure 12:
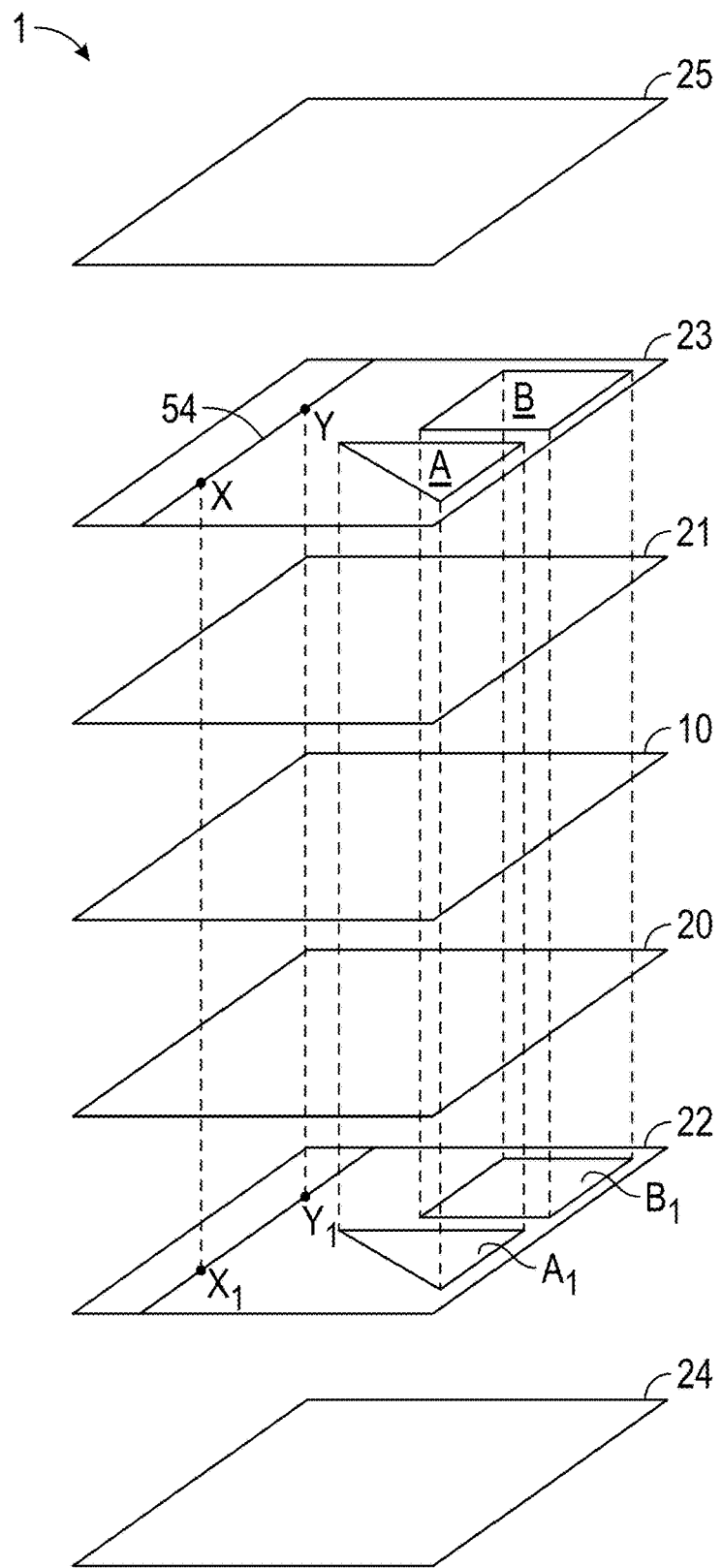
FIG. 12 is an exploded view of the multi-layer device of FIG. 1.

In one embodiment, with the electrochromic device geometry of FIG. 12, the non-linearity in the $\Delta r_{p-l}(x)$ of the first and/or second electrically conductive layer may be observed by comparing the ratio of the average $\Delta r_{p-l}(x)$ in two different regions of the first and/or second electrically conductive layer, wherein the first and second regions are each mutually exclusive regions of a single line oriented in the x-direction, and each region comprises at least 25% of the x-dimensional length of the first and/or second electrically conductive layer. For example, in one such embodiment, the ratio of the average $\Delta r_{p-l}(x)$ in a first region of the first and/or second electrically conductive layer, $\Delta r^{avg1}_{p-l}$, to the average $\Delta r_{p-l}(x)$ in a second region of the first and/or second electrically conductive layer, $\Delta r^{avg2}_{p-l}$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein the first and second region are each mutually exclusive regions of a single line oriented in the x-direction, and each region comprises at least 25% of the x-dimensional length of the first and/or second electrically conductive layer.

In one embodiment, the non-linearity in the resistance of the first and/or second electrically conductive layer may be observed by comparing the average ratio $\varphi(x)=r_{pattern}(x)/r_{linear}(x)$ in two mutually exclusive regions of the first and/or second electrically conductive layer wherein the first and second regions are each circumscribed by a convex polygon and each comprises at least 25% of the surface area of the electrically conductive layer. For example, in one such embodiment, the average $\varphi(x)$ in a first region of the first and/or second electrically conductive layer, $\varphi^{avg1}(x)$, to the average $\varphi(x)$ in a second region of the first and/or second electrically conductive layer, $\varphi^{avg2}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the electrically conductive layer. This may be illustrated by reference to FIG. 12. First electrically conductive layer 22 comprises convex polygon $A_1$ and convex polygon $B_1$ and each circumscribes a mutually exclusive region comprising at least 25% of the surface area of the electrically conductive layer 22; in one embodiment, the ratio of the average in a first region of the first electrically conductive layer bounded by convex polygon $A_1$, $\varphi^{avg1}(x)$, to the average in a second region of the first electrically conductive layer bounded by convex polygon $B_1$, $\varphi^{avg2}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

In one embodiment, the non-linearity in the resistance of the first and/or second electrically conductive layer may be observed by comparing the average $\Delta r_{p\text{-}l}(x)$ in two mutually exclusive regions of the first and/or second electrically conductive layer wherein the first and second regions are each circumscribed by a convex polygon and each comprises at least 25% of the surface area of the electrically conductive layer. For example, in one such embodiment, the average $\Delta r_{p\text{-}l}(x)$ in a first region of the first and/or second electrically conductive layer, $\Delta r^{avg1}_{p\text{-}l}$, to the average $\Delta r_{p\text{-}l}(x)$ in a second region of the first and/or second electrically conductive layer, $\Delta r^{avg2}_{p\text{-}l}$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the electrically conductive layer. This may be illustrated by reference to FIG. 12. First electrically conductive layer 22 comprises convex polygon $A_1$ and convex polygon $B_1$ and each circumscribes a mutually exclusive region comprising at least 25% of the surface area of the electrically conductive layer 22; in one embodiment, the ratio of the average in a first region of the first electrically conductive layer bounded by convex polygon $A_1$, $\Delta r^{avg1}_{p\text{-}l}(x)$, to the average in a second region of the first electrically conductive layer bounded by convex polygon $B_1$, $\Delta r^{avg2}_{p\text{-}l}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

In one embodiment, the non-linearity in the resistance of the first and/or second electrically conductive layer may be observed by comparing the average $r_n$ in two mutually exclusive regions of the first and/or second electrically conductive layer wherein the first and second regions are each circumscribed by a convex polygon and each comprises at least 25% of the surface area of the electrically conductive layer. For example, in one such embodiment, the average $r_n$ in a first region of the first and/or second electrically conductive layer, $r^{avg1}_n$, to the average $r_n$ in a second region of the first and/or second electrically conductive layer, $r^{avg2}_n$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the electrically conductive layer. This may be illustrated by reference to FIG. 12. First electrically conductive layer 22 comprises convex polygon $A_1$ and convex polygon $B_1$ and each circumscribes a mutually exclusive region comprising at least 25% of the surface area of the electrically conductive layer 22; in one embodiment, the ratio of the average in a first region of the first electrically conductive layer bounded by convex polygon $A_1$, $r^{avg1}_n$, to the average in a second region of the first electrically conductive layer bounded by convex polygon $B_1$, $r^{avg2}_n$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

Referring again to FIG. 12, the spatial non-uniformity and non-linearity of the resistance of the first and second electrically conductive layer may be correlated in accordance with one aspect of the present invention. For example, line segment $X_1$-$Y_1$ in first electrically conductive layer 22 may be projected through second electrode layer 21, ion conductor layer 10 and first electrode layer 20 and onto second electrically conductive layer 23, with the projection defining line segment X-Y. In general, if the resistance between the bus bar and a location along line segment $X_1$-$Y_1$ is non-linear and generally increases in first electrically conductive layer 22 (i.e., the resistance generally increases non-linearly moving along the resistance gradient curve in the direction from point $X_1$ to point $Y_1$), the resistance between the bus bar and a location along segment X-Y generally decreases in second electrically conductive layer 23 (i.e., the resistance generally decreases non-linearly along the resistance gradient curve 54 in the direction from point X to point Y). Line segments X-Y and $X_1$-$Y_1$ can have a minimum length of at least 1 cm, or in the case of a rectangular substrate the line segments can be at least 25% of the total length or width of the substrate. For example, line segments X-Y and $X_1$-$Y_1$ may have a length of 2.5 cm, 5 cm, 10 cm, or 25 cm. Additionally, line segments X-Y and $X_1$-$Y_1$ may be straight or curved. In one embodiment, for example, the resistance gradients in electrically conductive layers 22, 23 are non-zero constants and are of opposite sign (e.g., the resistance generally increases non-linearly in first electrically conductive layer along in the direction from point $X_1$ to point $Y_1$ and generally decreases non-linearly along sheet resistance gradient curve 54 in the direction from point X to point Y). By way of further example, in one embodiment, substrates 24, 25 are rectangular and the resistance gradients in electrically conductive layers 22, 23 are non-zero constants and are of opposite sign (e.g., the sheet resistance generally increases non-linearly in second electrically conductive layer 23 along gradient 54 in the direction from point X to point Y and generally decreases non-linearly in first electrically conductive layer 22 along the line containing line segment $X_1$-$Y_1$ in the direction from point $X_1$ to point $Y_1$).

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

Figure 13A:
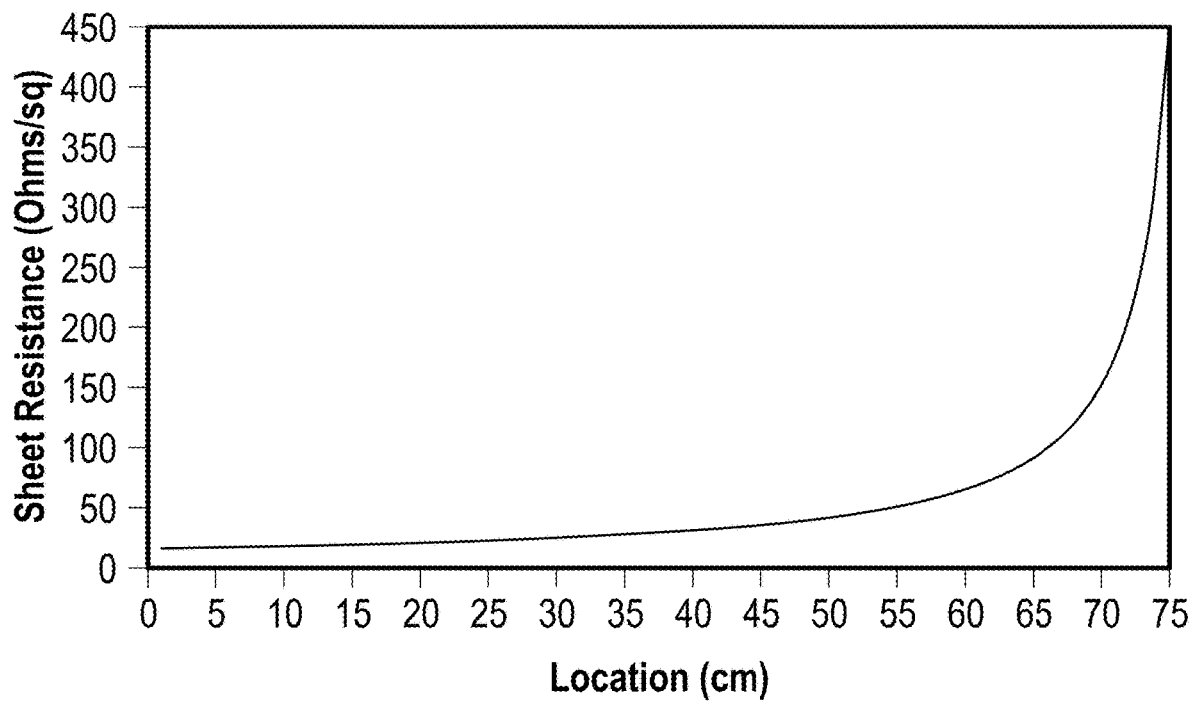
FIG. 13A is a plot of the sheet resistance profile along a resistance gradient line for a single rectangular electrically conductive layer with a geometry similar that shown in FIGS. 2 and 3.

Patterned Electrically Conductive Layer with a Hyperbolic Resistance Profile FIG. 13A shows the sheet resistance profile along a resistance gradient line for a rectangular electrically conductive layer with a geometry similar that shown in FIGS. 2 and 3. The device in this example was approximately 75 cm long, and 130 cm wide. The bus bar was located at x=0, and with width (W) is 130 cm. In this example, the electrically conductive layer was patterned to approximate the sheet resistance profile shown in FIG. 13A. The desired sheet resistance varied from approximately 15 Ohm/sq. near the bus bar to approximately 450 Ohm/sq. at the opposite end of the layer.

Figure 13B:
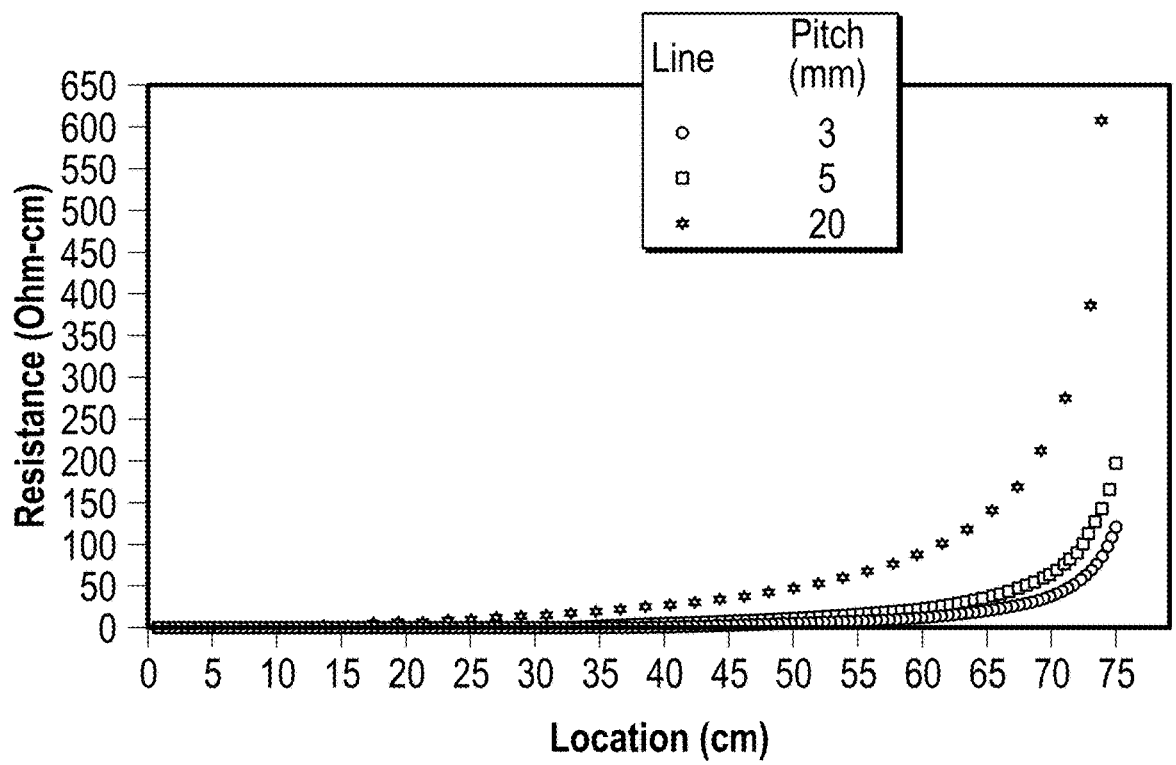
FIG. 13B is a plot of the resistance of sets of scribed lines that will approximate the sheet resistance profile shown in FIG. 13A.

FIG. 13B shows the resistance of sets of scribed lines that approximated the sheet resistance profile shown in FIG. 13A. The sets of scribed lines were oriented parallel to the bus bar (i.e., along isoresistance lines perpendicular to the resistance gradient lines) as shown in FIG. 4. In this example the resistance of each set of scribed lines is plotted for three different pitch scenarios (i.e., 307 in FIG. 4) equal to 3, 5 and 20 mm. As described above, $r_n$ is defined as the resistance added by the set of scribed lines. The discrete points plotted in FIG. 13B indicate the resistance of the sets of scribed lines (i.e., $r_n$ as described above) to the flow of electrons in the x direction per centimeter (cm) of width (W, as described above). In other words, the discrete points plotted in FIG. 13B indicate the resistance of the sets of scribed lines (i.e., $r_n$ as described above) to the flow of electrons in the x direction if the substrate were 1 cm wide (i.e., W=1 cm). For the case of the 3 mm pitch, the resistance per cm width of the set of scribed lines in the x direction varied from approximately 0 Ohm-cm to approximately 120 Ohm-cm. For the case of the 5 mm pitch, the resistance per cm width of the set of scribed lines in the x direction varied from 0 Ohm-cm to 200 Ohm-cm. For the case of the 20 mm pitch, the resistance per cm width of the set of scribed lines in the x direction varied from 0 Ohm-cm to 615 Ohm-cm. When the pitch between sets of scribed lines (i.e., 307 in FIG. 4) was smaller there were more scribes total on the substrate, and therefore the resistance of each of the scribes (i.e., $r_n$) was smaller because each scribe was required to add less resistance to match the desired profile shown in FIG. 13A. The values plotted in FIG. 13B are the resistances per cm of the width of the layer, and therefore need to be divided by 130 to give the absolute $r_n$ values (in Ohms) for the 130 cm wide substrate in this example.

Example 2

Figure 14A:
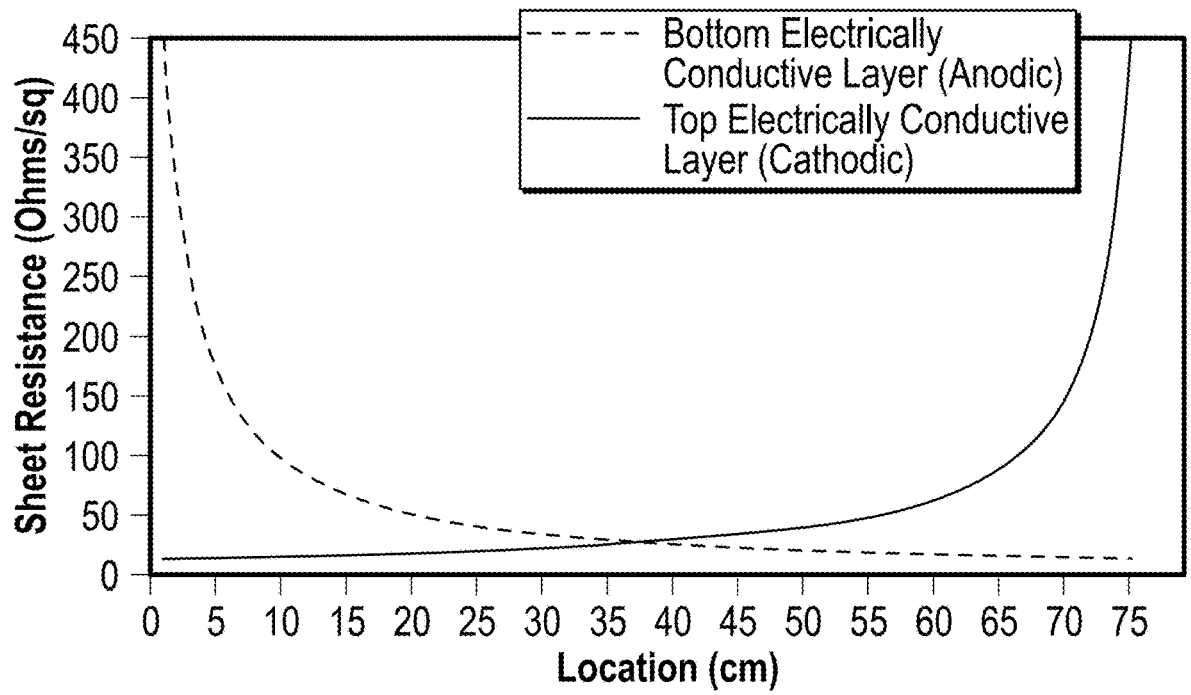
FIG. 14A is a plot of the sheet resistance profile along resistance gradient lines for both substrates in the simple geometry described in FIG. 3.

Patterned Electrically Conductive Layers with Opposing Hyperbolic Resistance Profiles FIG. 14A shows the sheet resistance profile along resistance gradient lines for both substrates in the simple geometry described in FIG. 3. The device in this example was approximately 75 cm long, and 130 cm wide. The bus bar on the top electrically conductive layer (the cathode in this case) was at x=0 cm, and the bus bar on the bottom electrically conductive layer (the anode in this case) was at approximately x=75 cm. The width (W) of both substrates and electrically conductive layers was 130 cm. In this example, both electrically conductive layers were patterned to approximate the sheet resistance profiles shown in FIG. 14A. The desired sheet resistance varied from approximately 15 Ohm/sq. to approximately 450 Ohm/sq.

The sheet resistance profiles in this example followed the form of $R(x)=1/[a*(x_f-x)]$ then $R'(x)=1/(a*x)$, in order to satisfy the relationship between the sheet resistance profiles of the two substrates $R'(x)=R(x)*(x_f/x-1)$ (as discussed herein). As discussed herein, this relationship enables the device to have a more uniform potential between the two electrically conductive layers over the whole area of the device, even though the bus bars are located at the edges.

Figure 14B:
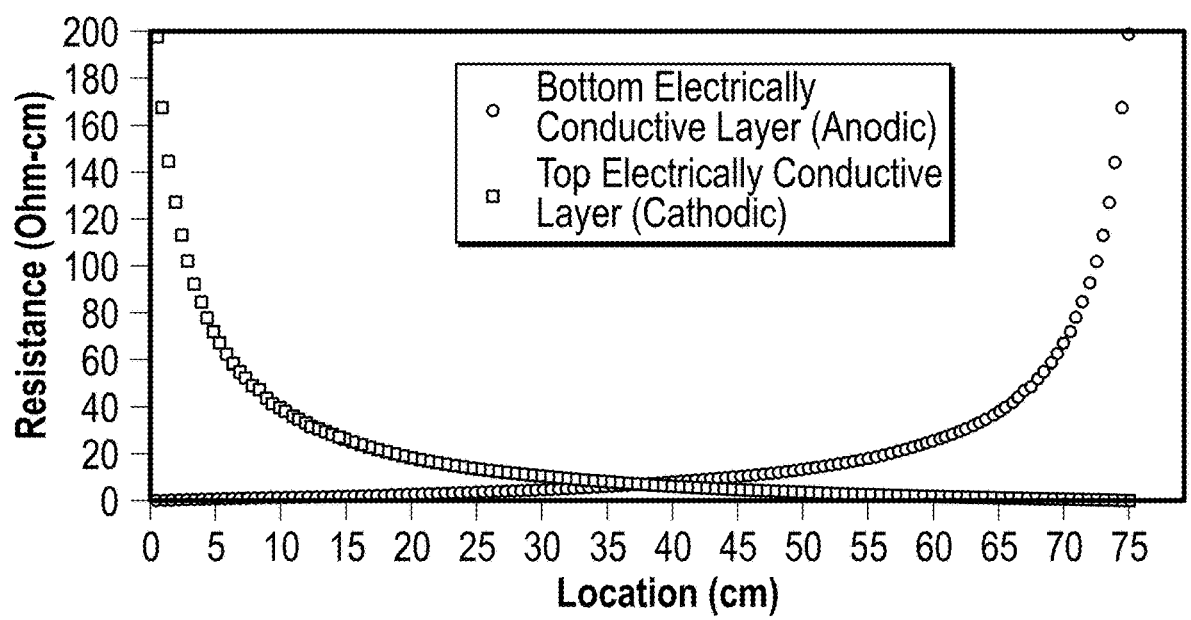
FIG. 14B is a plot of the resistance of sets of scribed lines that will approximate the sheet resistance profiles shown in FIG. 14A.

FIG. 14B shows the resistance of sets of scribed lines that approximated the sheet resistance profiles shown in FIG. 14A. The sets of scribed lines on both substrates were oriented parallel to the bus bar (i.e., along isoresistance lines perpendicular to the resistance gradient lines) as shown in FIG. 4. In this example the pitch (i.e., 307 in FIG. 4) between sets of scribed lines was 5 mm. The discrete points plotted in FIG. 14B indicate the resistance of the sets of scribed lines (i.e., $r_n$ as described above) to the flow of electrons in the x direction per cm width of the substrate (i.e., the resistance if the substrate were 1 cm wide, W=1 cm). The resistance per cm of width of the set of scribed lines in the x direction varied from approximately 0 Ohm-cm to approximately 200 Ohm-cm. The values plotted in FIG. 14B are the resistances per cm width of the layer, and therefore need to be divided by 130 to give the absolute $r_n$ values (in Ohms) for the 130 cm wide substrates in this example.

Example 3

Electrochromic Device with Patterned Electrically Conductive Layers

The transmission of an electrochromic device with uniform electrically conductive layers as a function of time while switching from a bleached state to a dark state will have an iris effect, where the switching rate at the center and the edge of the device will be different. The uniform device in this example was approximately 75 cm long, and 130 cm wide, and the bus bar on the top electrically conductive layer (the cathode in this case) is at x=0 cm, and the bus bar on the bottom electrically conductive layer (the anode in this case) was at approximately x=75 cm. The width (W) of both substrates and electrically conductive layers was 130 cm.

Figure 15:
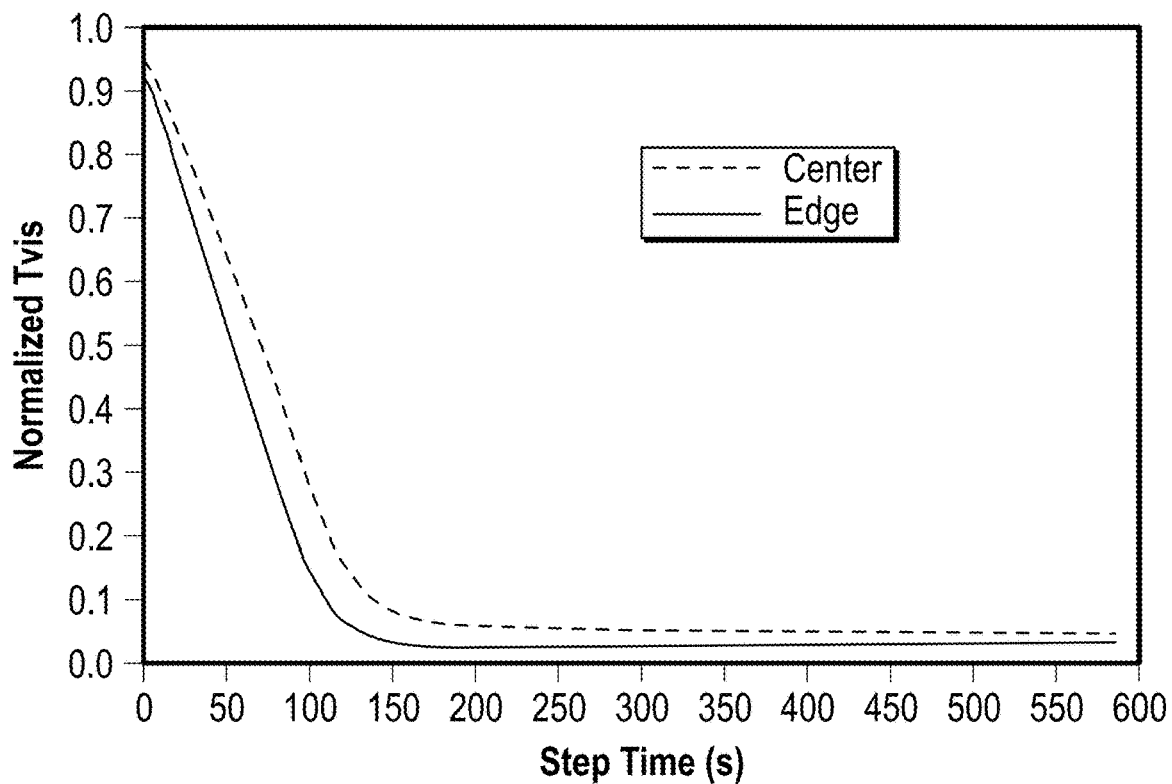
FIG. 15 is a plot of the transmission over time of an electrochromic device incorporating a patterned electrically conductive layer while switching from a bleached to a darkened state. The transmission of the device is shown at two different locations, one close to the center of the device and one approximately 2 cm from the edge of the device near one of the bus bars.

FIG. 15 shows the transmission of an electrochromic device incorporating the patterned electrically conductive layers shown in Example 2 (with resistances of sets of scribed lines described in FIG. 14B) as a function of time while switching from a bleached state to a dark state. The patterned device in this example was also approximately 75 cm long, and 130 cm wide. The bus bar on the top electrically conductive layer (the cathode in this case) was at x=0 cm, and the bus bar on the bottom electrically conductive layer (the anode in this case) was at approximately x=75 cm. The width (W) of both substrates and electrically conductive layers was 130 cm. The transmission of the device is shown at two different locations, one close to the center of the device and one approximately 2 cm from the edge of the device near one of the bus bars, over time. The lighter line is the transmission of the device close to the center, and the darker line is the transmission of the device close to the edge. The trigger for the device to start switching is at a "StepTime" of approximately 0 s. The transmission in FIG. 15 is normalized to transmission at the center of the device in the fully bleached state. The transmission of the device close to the edge switches from the bleached state to a dark state of less than 10% transmission in approximately 120 s. The transmission of the device close to the center switches from the bleached state to a dark state of less than 10% transmission in approximately 140 s.

Figure 16:
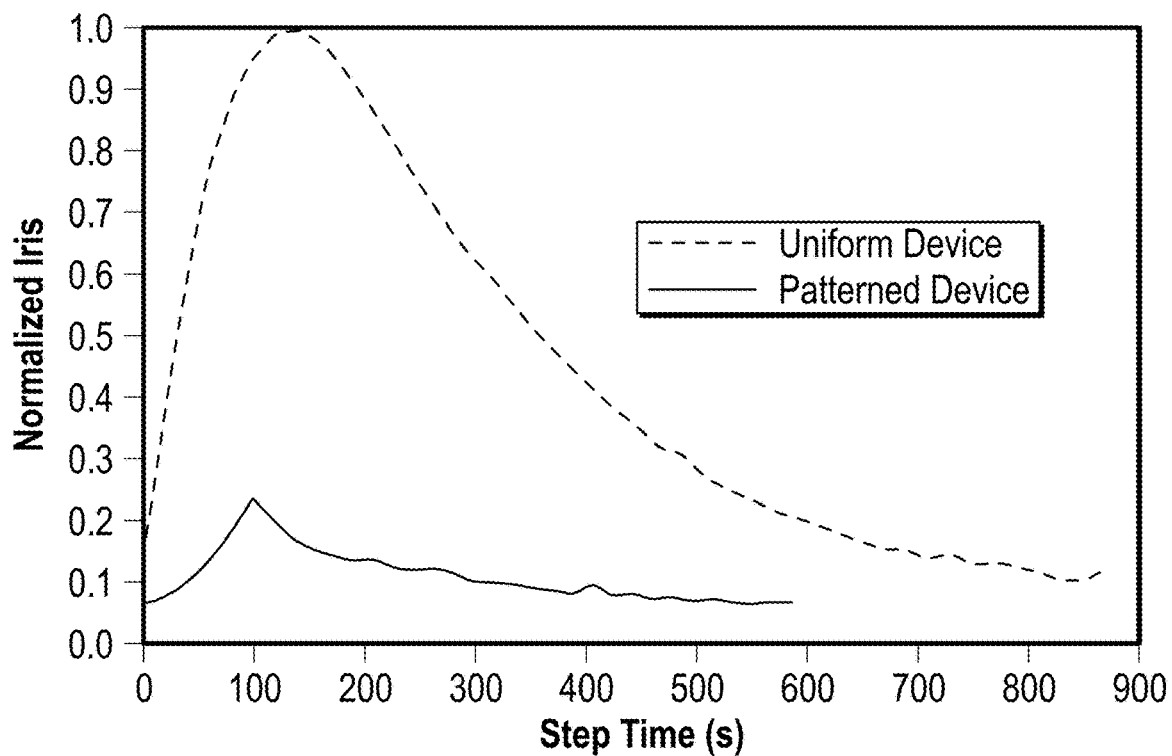
FIG. 16 is a plot of the difference in transmission near the edge of the device subtracted from the transmission near the center of the device for uniform and the patterned electrochromic devices.

FIG. 16 shows the difference in transmission near the edge of the device subtracted from the transmission near the center of the device for the uniform and patterned electrochromic devices described in this example. The difference in transmission from center to edge normalized to the maximum difference in the uniform case is referred to as the "normalized iris" in the figure. The data in FIG. 16 shows that the patterned device had much better optical uniformity than the uniform device during switching. At the peak of center to edge non-uniformity in the uniform case (i.e., about 150 s after triggering a switch from bleached to dark) the patterned device had less than 20% of the normalized iris compared to the uniform case.

Example 4

Electrochromic Device with Patterned Electrically Conductive Layers

The transmission of an electrochromic device with uniform electrically conductive layers as a function of time while switching from a bleached state to a dark state will have an iris effect, where the switching rate at the center and the edge of the device will be different. The uniform device in this example was approximately 75 cm long, and 130 cm wide, and the bus bar on the top electrically conductive layer (the cathode in this case) was at x=0 cm, and the bus bar on the bottom electrically conductive layer (the anode in this case) was at approximately x=75 cm. The width (W) of both substrates and electrically conductive layers was 130 cm.

Figure 17A:
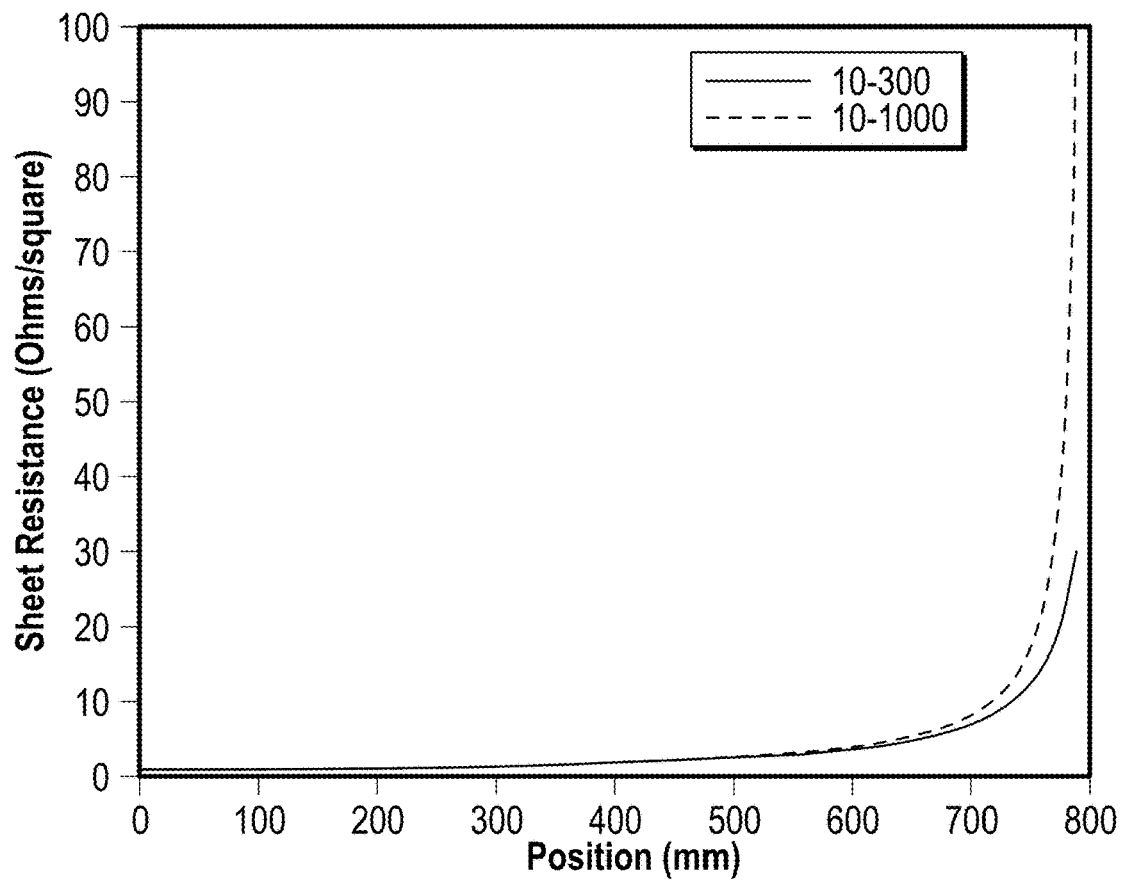
FIG. 17A shows sheet resistance profiles.
Figure 17B:
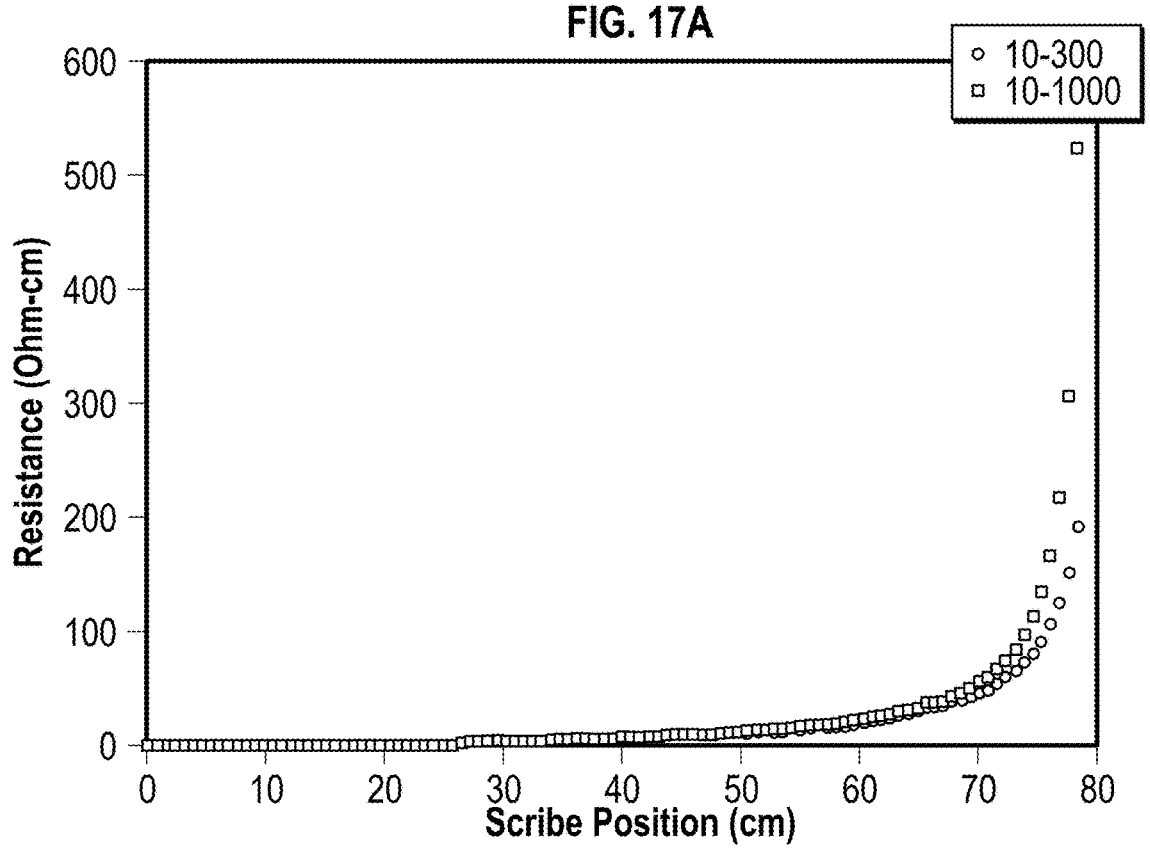
FIG. 17B shows the resistance of sets of scribed lines used to simulate the sheet resistance profiles in FIG. 17A.

The patterned electrochromic devices incorporate patterned electrically conductive layers similar to those shown in Example 2. One of the patterned devices had patterned electrically conductive layers that approximate hyperbolic sheet resistance profiles from approximately 10 Ohms/sq. to approximately 300 Ohms/sq., and the other patterned device had patterned electrically conductive layers that approximate hyperbolic sheet resistance profiles from approximately 10 Ohms/sq. to approximately 1000 Ohms/sq. The patterned devices in this example were also approximately 75 cm in length, and 130 cm in width. The bus bar on the top electrically conductive layer (the cathode in this case) was at x=0 cm (along the length), and the bus bar on the bottom electrically conductive layer (the anode in this case) was at approximately x=75 cm (along the length). The width (W) of both substrates and electrically conductive layers was 130 cm. The 10-300 Ohm/sq. devices in this example, had the electrically conductive layer on the top substrate (cathodic) patterned to approximate the "10-300" sheet resistance profile shown in FIG. 17A, where the "Position (mm)" is along the length of the device. The 10-1000 Ohm/sq. devices in this example, had the electrically conductive layer on the top substrate (cathodic) patterned to approximate the "10-1000" sheet resistance profiles shown in FIG. 17A, where the "Position (mm)" is along the length of the device. The bottom electrically conductive layers (anodic) were also patterned to approximate the same sheet resistance profiles shown in FIG. 17A, with the x-axis inverted (similarly to those shown in FIGS. 14A and 14B). FIG. 17B shows the resistance of sets of scribed lines for the 10-300 Ohm/sq. and 10-1000 Ohm/sq. devices that approximated the sheet resistance profiles shown in FIG. 17A. Again, the discrete points plotted in FIG. 17B indicate the resistance of the sets of scribed lines (i.e., $r_n$ as described above) to the flow of electrons in the x direction per cm width of the substrate (i.e., the resistance if the substrate were 1 cm wide, W=1 cm). The resistance per cm of width of the set of scribed lines in the x direction varied from approximately 0 Ohm-cm to approximately 200 Ohm-cm or 500 Ohm-cm. The values plotted in FIG. 17B are the resistances per cm width of the layer, and therefore need to be divided by 130 to give the absolute $r_n$ values (in Ohms) for the 130 cm wide substrates in this example.

Figure 18:
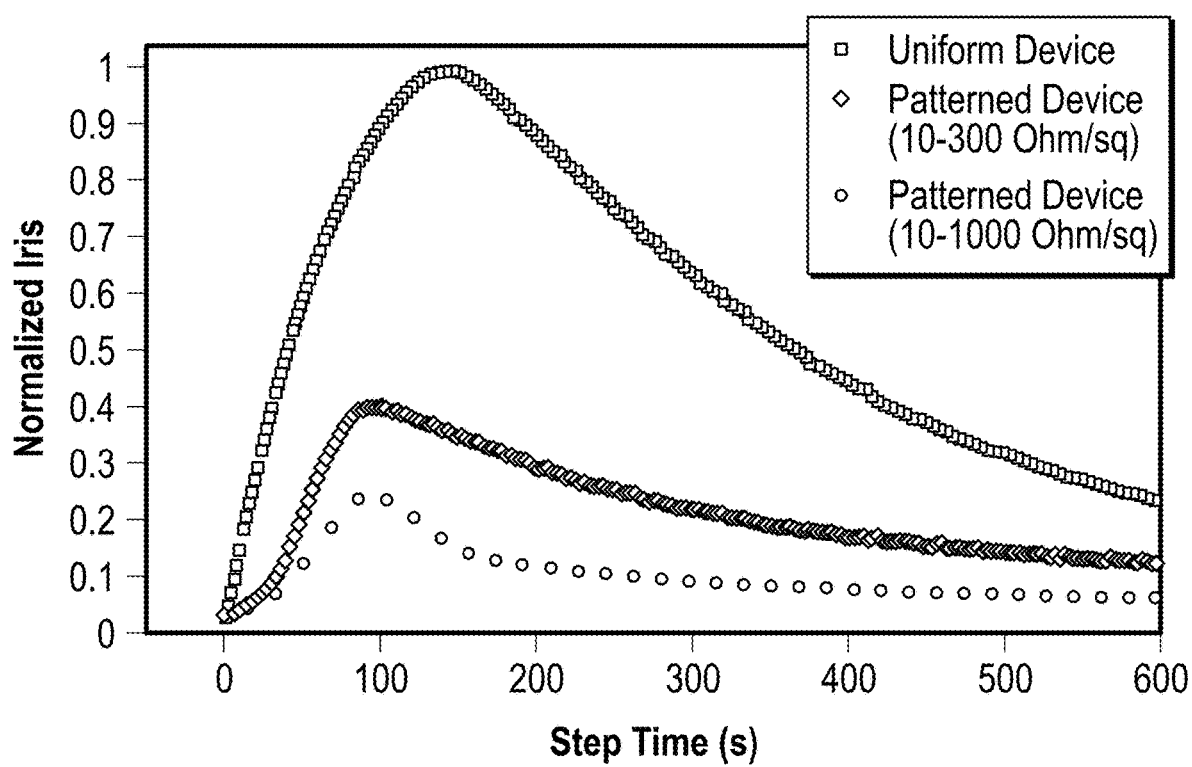
FIG. 18 shows differences in transmission at different positions on a device.

FIG. 18 shows the difference in transmission near the edge of the device subtracted from the transmission near the center of the device for the uniform and two different patterned electrochromic devices. The difference in transmission from center to edge normalized to the maximum difference in the uniform case is referred to as the "normalized iris" in the figure. The data in FIG. 18 shows that the patterned devices had improved optical uniformity compared to the uniform device during switching. At the peak of center to edge non-uniformity in the uniform case (i.e., about 100 s after triggering a switch from bleached to dark) the patterned device approximating the 10-300 Ohms/sq. sheet resistance profiles had approximately 40% of the normalized iris compared to the uniform case. At the peak of center to edge non-uniformity in the uniform case (i.e., about 100 s after triggering a switch from bleached to dark) the patterned device approximating the 10-1000 Ohms/sq. sheet resistance profiles had approximately 25% of the normalized iris compared to the uniform case.

Example 5

Electrochromic Device with Visually Perceptible Patterns

FIGS. 19A-19D show images of an electrochromic device that displayed visually perceptible patterns during switching. The electrochromic device in this example was a patterned electrochromic device incorporating patterned electrically conductive layers similar to those shown in Example 2. The device in this example had patterned electrically conductive layers that approximated hyperbolic sheet resistance profiles from approximately 10 Ohms/sq. to approximately 1000 Ohms/sq. The 10-1000 Ohm/sq. device in this example, had the electrically conductive layer on the top substrate (cathodic) patterned to approximate the "10-1000" sheet resistance profile shown in FIG. 17A, where the "Position (mm)" is along the length of the device. The bottom electrically conductive layers (anodic) were also patterned to approximate the same sheet resistance profiles shown in FIG. 17A, with the x-axis inverted (similarly to those shown in FIGS. 14A and 14B). FIG. 17B shows the resistance of sets of scribed lines for the 10-1000 Ohm/sq. device that approximated the sheet resistance profiles shown in FIG. 17A. Additionally, the device described in this Example had a period offset (e.g., element 309 in FIG. 11B) equal to approximately half of the period (e.g., element 305 in FIG. 11B).

Figure 19B:
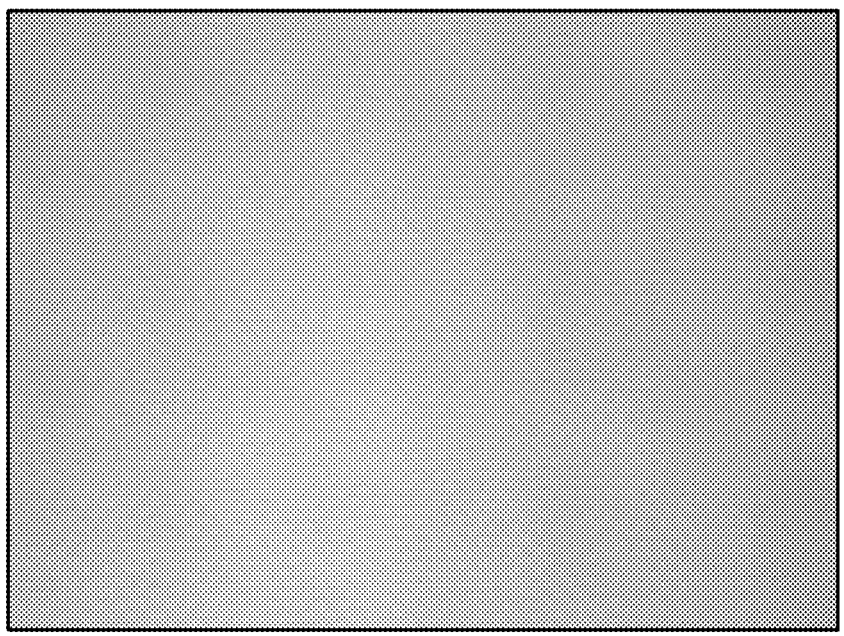
FIG. 19A shows an image (optical photograph) of a device during bleaching and FIG. 19B shows an image of the same device during darkening.
Figure 19A:
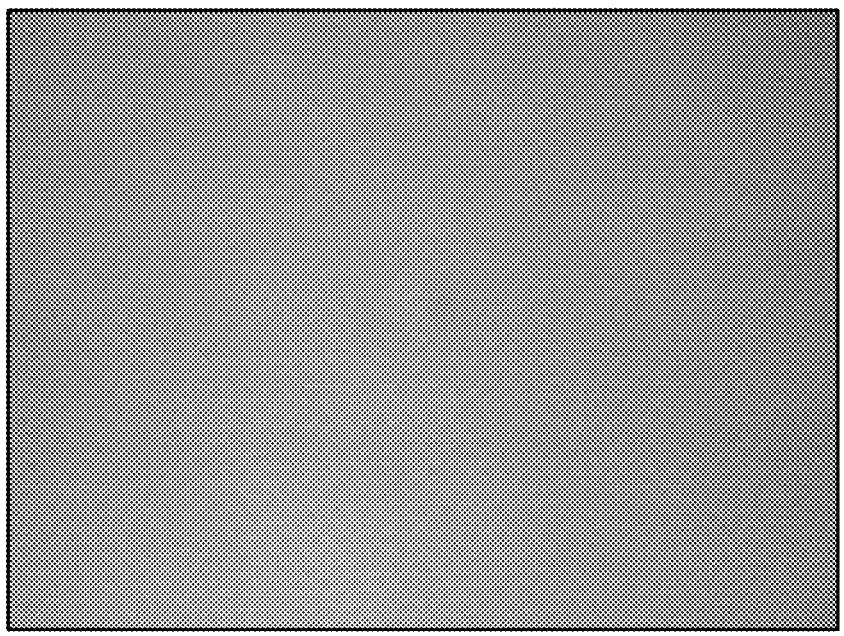
Figure 19D:
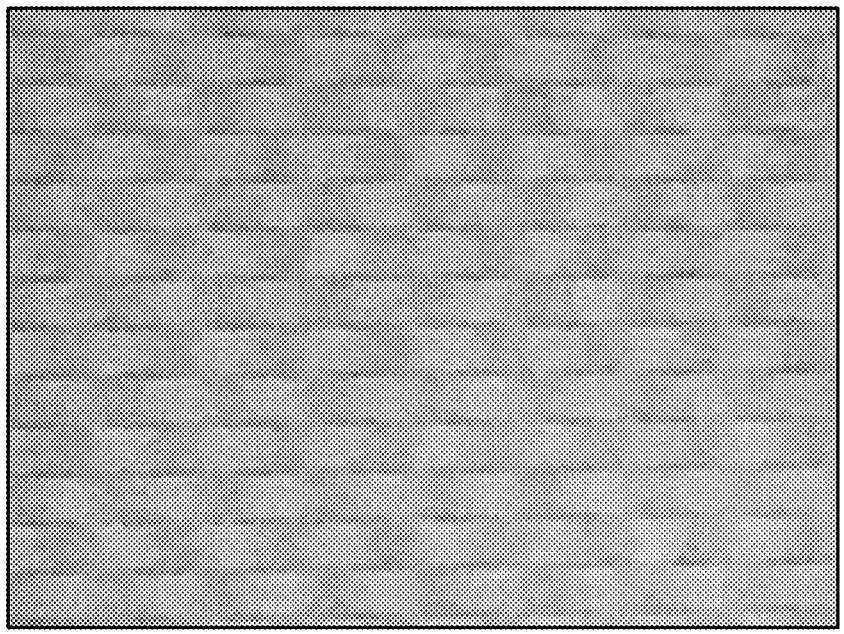
FIG. 19D is a zoomed in area of FIG. 19C.
Figure 19C:
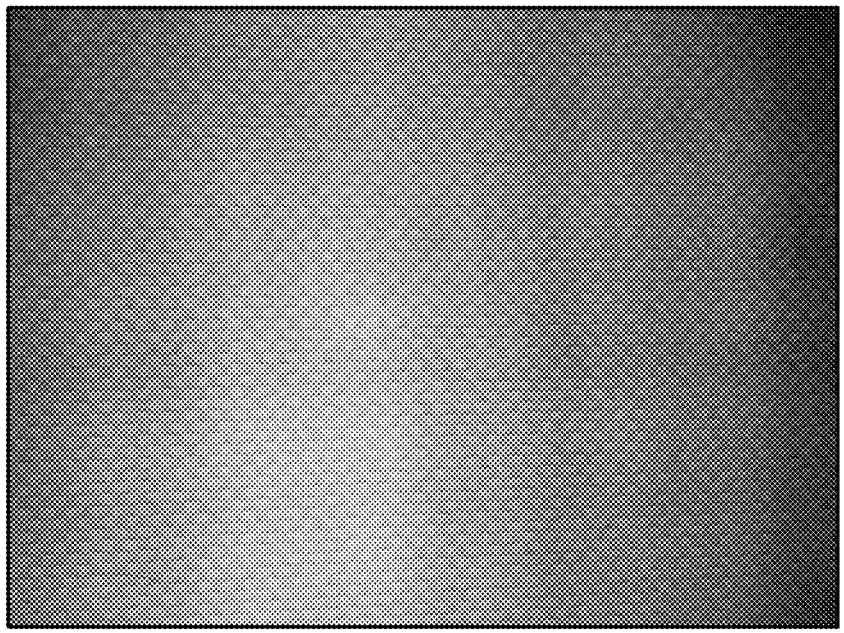
FIG. 19C shows an image (optical photograph) of a device during bleaching, with the contrast increased to accentuate the pattern.

FIG. 19A shows an image (optical photograph) of the device during bleaching (i.e., from a less transmissive state to a more transmissive state), illustrating that the device had different optical transmission at different locations during bleaching. FIG. 19B shows an image (optical photograph) of the device during darkening (i.e., from a more transmissive state to a less transmissive state), illustrating that the device had different optical transmission at different locations during darkening. FIG. 19C is the same image as FIG. 19A, with the contrast increased to accentuate the pattern. FIG. 19D is a zoomed in area of FIG. 19C. The visually perceptible patterns in the device in this Example were approximately periodic, and could be described as a honeycomb or a checkerboard pattern.

What is claimed is:

1. An electrochromic device, comprising:
   a first transparent substrate and a second transparent substrate;
   a first electrically conductive layer and a second electrically conductive layer;
   a first bus bar in contact with the first electrically conductive layer; and
   a second bus bar in contact with the second electrically conductive layer,
   wherein the first electrically conductive layer is patterned with sets of scribed lines substantially parallel to the first bus bar, wherein the sets of scribed lines are made up of a series of collinear segments, which are gaps in the electrically conductive layer, wherein the length of the collinear segments, the period, the valve width and the offset between segments in adjacent scribed lines determines the resistance to the flow of electrons traversing a set of scribed lines in the direction substantially perpendicular to the first bus bar, and
   the second electrically conductive layer is patterned with sets of scribed lines substantially parallel to the second bus bar, wherein the sets of scribed lines are made up of a series of collinear segments, which are gaps in the electrically conductive layer, wherein the length of the collinear segments, the period, the valve width and the offset between segments in adjacent scribed lines determines the resistance to the flow of electrons traversing a set of scribed lines in the direction substantially perpendicular to the second bus bar.

2. The electrochromic device of claim 1, wherein
   the first electrically conductive layer comprises a first transparent conductive material,
   the second electrically conductive layer comprises a second transparent conductive material,
   the sheet resistance of the first transparent conductive material without scribed lines as a function of position x is $R_{TC}(x)$,
   the sheet resistance of the second transparent conductive material without scribed lines as a function of position x is $R_{TC}(x)$,
   the first electrically conductive layer comprises N sets of scribed lines, and the resistance to the flow of electrons traversing the $n^{th}$ set of scribed lines in the direction perpendicular to the first bus bar in the first electrically conductive layer is $r_n$, and is approximated by the function $r_n = \int \{[R(x) - R_{TC}(x)]/W\}\, dx$, evaluated in the interval from $[x_{n-1}, x_n]$, and
   the second electrically conductive layer comprises N sets of scribed lines, and the resistance to the flow of electrons traversing the $n^{th}$ set of scribed lines in the direction perpendicular to the second bus bar in the second electrically conductive layer is $r'_n$, and is approximated by the function $r'_n = \int \{[R'(x) - R_{TC}(x)]/W\}\, dx$, evaluated in the interval from $[x_{n+1}, x_n]$.

3. The electrochromic device of claim 1, wherein the resistance to the flow of electrons traversing the $n^{th}$ set of scribed lines in the direction perpendicular to the first bus bar in the first electrically conductive layer is from about 0 Ohm-cm to about 10000 Ohm-cm.

4. The electrochromic device of claim 1, wherein the average resistance to the flow of electrons traversing the $n^{th}$ set of scribed lines in the direction perpendicular to the first bus bar in the first electrically conductive layer is from about 0 Ohm-cm to about 1000 Ohm-cm.

5. The electrochromic device of claim 1, wherein the length of the collinear segments in the sets of scribed lines are from about 0.1 mm to about 100 mm.

6. The electrochromic device of claim 1, wherein the first bus bar is located at one edge of the electrochromic device that has a substantially rectangular shape.

7. The electrochromic device of claim 1, wherein the first electrically conductive layer is patterned.

8. The electrochromic device of claim 1, wherein the thickness of the first electrically conductive layer is changing.

9. The electrochromic device of claim 1, wherein electrical properties of the first electrically conductive layer is changing.

10. The electrochromic device of claim 1, wherein the second bus bar is located at one edge of the electrochromic device.

11. The electrochromic device of claim 1, wherein the second electrically conductive layer is patterned.

12. The electrochromic device of claim 1, wherein the thickness of the second electrically conductive layer is changing.

13. The electrochromic device of claim 1, wherein the electrical properties of the second electrically conductive layer is changing.

14. The electrochromic device of claim 1, wherein
   visually perceptible patterns exist in the device during switching from a more transmissive state to a less transmissive state, or from a less transmissive state to a more transmissive state.

15. The electrochromic device of claim 1, wherein
   the direction perpendicular to the first bus bar in the plane of the first electrically conductive layer is x,
   the direction perpendicular to the second bus bar in the plane of the second electrically conductive layer is x,
   the sheet resistance of the first electrically conductive layer is approximated by a function $R(x)$,
   the sheet resistance of the second electrically conductive layer is approximated by a function $R'(x)$,
   the first bus bar is located approximately at a position x=0,
   the second bus bar is located approximately at a position $x=x_t$, and
   the relationship between the sheet resistance of the first and second electrically conductive layers approximately follow the relationship $R'(x) = R(x) * (x_t/x - 1)$.

16. The electrochromic device of claim 15, wherein
   the sheet resistance of the first electrically conductive layer is approximated by the function $R(x) = 1/[a*(x_t - x)]$, and
   the sheet resistance of the second electrically conductive layer is approximated by the function $R'(x) = 1/(a*x + b)$ where b is small relative to a.

17. The electrochromic device of claim 15, wherein
   the width of the first electrically conductive layer in the direction substantially parallel to the first bus bar is W, the width of the second electrically conductive layer in the direction substantially parallel to the second bus bar is also W, the resistance between the first bus bar and a first line substantially parallel to the first bus bar in the first electrically conductive layer is approximated by the function $r(x)=\int[R(x)/W]\,dx$, evaluated in the interval from $x=0$ to $x=x$, and the resistance between the second bus bar and a second line substantially parallel to the second bus bar in the second electrically conductive layer is approximated by the function $r'(x)=\int[R'(x)/W]\,dx$, evaluated in the interval from $x=x$ to $x=x_t$.

18. The electrochromic device of claim 17, wherein the first substrate is approximately rectangular, the first substrate is approximately 75 cm long in the direction perpendicular to the first bus bar and 130 cm wide in the direction parallel to the first bus bar, the pitch between sets of scribed lines in the first and second electrically conductive layers is approximately 5 cm, and the resistance to the flow of electrons traversing the $n^{th}$ set of scribed lines in the direction perpendicular to the first bus bar in the first electrically conductive layer is from about 0 Ohm-cm to about 1000 Ohm-cm.

\* \* \* \* \*